(12) United States Patent
Fomukong et al.

(10) Patent No.: US 8,060,109 B2
(45) Date of Patent: *Nov. 15, 2011

(54) AUTHORIZED LOCATION REPORTING MOBILE COMMUNICATION SYSTEM

(75) Inventors: Mundi Fomukong, Los Angeles, CA (US); Denzil Willoughby Chesney, Los Angeles, CA (US)

(73) Assignee: Enovsys LLC, Beverly Hills, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/933,276

(22) Filed: Oct. 31, 2007

(65) Prior Publication Data

US 2008/0051107 A1    Feb. 28, 2008

Related U.S. Application Data

(63) Continuation of application No. 10/414,348, filed on Apr. 15, 2003, which is a continuation of application No. 09/265,236, filed on Mar. 8, 1999, now Pat. No. 6,560,461, which is a continuation-in-part of application No. 08/905,674, filed on Aug. 4, 1997, now Pat. No. 5,918,159.

(51) Int. Cl.
*H04W 24/00*    (2009.01)
(52) U.S. Cl. .............. 455/456.1; 455/404.1; 455/404.2; 455/457
(58) Field of Classification Search ........ 455/456.1–457
See application file for complete search history.

(56) References Cited

U.S. PATENT DOCUMENTS

| | | | |
|---|---|---|---|
| 3,947,807 A | 3/1976 | Tyler |
| 3,979,731 A | 9/1976 | Naplatanov |
| 3,984,807 A | 10/1976 | Haemmig |
| 4,109,247 A | 8/1978 | Kaplan |
| 4,112,421 A | 9/1978 | Freeny, Jr. |
| 4,177,466 A | 12/1979 | Reagan |
| 4,188,618 A | 2/1980 | Weisbart |
| 4,209,787 A | 6/1980 | Freeny, Jr. |
| 4,217,588 A | 8/1980 | Freeny, Jr. |
| 4,220,946 A | 9/1980 | Henriot |
| 4,229,737 A | 10/1980 | Heldwein |
| 4,232,266 A | 11/1980 | Acampora |
| 4,259,741 A | 3/1981 | Kawai |
| 4,285,064 A | 8/1981 | Hodge |
| 4,297,672 A | 10/1981 | Fruchey |
| 4,303,904 A | 12/1981 | Chasek |
| 4,313,035 A | 1/1982 | Jordan |
| 4,315,262 A | 2/1982 | Acampora |
| 4,319,352 A | 3/1982 | Gupta |

(Continued)

OTHER PUBLICATIONS

Allan Kirson; ATIS—A Modular Approach; Kirson—ATIS—A Modular Approach.pdf; In: IEEE Plans '92—Position Location and Navigation Symposium, Monterey, CA, Mar. 24-27, 1992, Record; (A93-10976 01-04), p. 528-533).

(Continued)

*Primary Examiner* — Dai A Phuong

(57) ABSTRACT

A location reporting paging communication system comprising space satellites, ground stations and a remote receiving unit adapted to resolve a global position from signals transmitted from a communication transmitter. The subscriber in possession of the remote receiving unit updates the paging network with global positioning information. A caller paging a subscriber in possession of the remote receiving unit may request the global location of the remote receiving unit. The paging network could divulge or block such information from a caller depending on the requirements of the subscriber.

16 Claims, 4 Drawing Sheets

U.S. PATENT DOCUMENTS

| | | | |
|---|---|---|---|
| 4,338,587 A | 7/1982 | Chiappetti | |
| 4,347,501 A | 8/1982 | Akerberg | |
| 4,350,969 A | 9/1982 | Greer | |
| 4,356,484 A | 10/1982 | Eckhardt | |
| 4,359,733 A | 11/1982 | O'Neill | |
| 4,381,509 A | 4/1983 | Rotman | |
| 4,393,493 A | 7/1983 | Edwards | |
| 4,398,192 A | 8/1983 | Moore | |
| 4,399,330 A | 8/1983 | Kuenzel | |
| 4,423,416 A | 12/1983 | Bailey | |
| 4,424,514 A | 1/1984 | Fennell | |
| 4,425,639 A | 1/1984 | Acampora | |
| 4,427,980 A | 1/1984 | Fennell | |
| 4,431,991 A | 2/1984 | Bailey | |
| 4,435,711 A | 3/1984 | Ho | |
| 4,491,947 A | 1/1985 | Frank | |
| 4,507,662 A | 3/1985 | Rothenberg | |
| 4,510,595 A | 4/1985 | Glance | |
| 4,512,033 A | 4/1985 | Schrock | |
| 4,517,561 A | 5/1985 | Burke | |
| 4,518,961 A | 5/1985 | Davis | |
| 4,531,129 A | 7/1985 | Bonebright | |
| 4,577,060 A | 3/1986 | Webb | |
| 4,577,316 A | 3/1986 | Schiff | |
| 4,581,736 A | 4/1986 | Dobyns | |
| 4,601,011 A | 7/1986 | Grynberg | |
| 4,626,858 A | 12/1986 | Copeland | |
| 4,628,506 A | 12/1986 | Sperlich | |
| 4,642,425 A | 2/1987 | Guinn, Jr. | |
| 4,644,351 A | 2/1987 | Zabarsky | |
| 4,648,123 A | 3/1987 | Schrock | |
| 4,651,156 A | 3/1987 | Martinez | |
| 4,652,884 A | 3/1987 | Starker | |
| 4,654,860 A | 3/1987 | Ouimet | |
| 4,661,972 A | 4/1987 | Kai | |
| 4,667,202 A | 5/1987 | Kammerlander | |
| 4,672,655 A | 6/1987 | Koch | |
| 4,672,656 A | 6/1987 | Pfeiffer | |
| 4,677,653 A | 6/1987 | Weiner | |
| 4,680,785 A | 7/1987 | Akiyama | |
| 4,684,949 A | 8/1987 | Kalafus | |
| 4,689,625 A | 8/1987 | Barmat | |
| 4,691,341 A | 9/1987 | Knoble | |
| 4,691,882 A | 9/1987 | Young | |
| 4,697,187 A | 9/1987 | Ohno | |
| 4,697,281 A | 9/1987 | O'Sullivan | |
| 4,700,374 A | 10/1987 | Bini | |
| 4,701,760 A | 10/1987 | Raoux | |
| 4,706,239 A | 11/1987 | Ito | |
| 4,713,661 A | 12/1987 | Boone | |
| 4,723,264 A | 2/1988 | Sasuta | |
| 4,730,305 A | 3/1988 | Acampora | |
| 4,742,514 A | 5/1988 | Goode | |
| 4,744,083 A | 5/1988 | O'Neill | |
| 4,748,622 A | 5/1988 | Muratani | |
| 4,752,967 A | 6/1988 | Bustamante | |
| 4,754,450 A | 6/1988 | Lynk, Jr. | |
| 4,757,267 A | 7/1988 | Riskin | |
| 4,763,129 A | 8/1988 | Perrotta | |
| 4,774,705 A | 9/1988 | Eaves, Jr. | |
| 4,776,035 A | 10/1988 | Duggan | |
| 4,791,572 A | 12/1988 | Green, III | |
| 4,797,948 A | 1/1989 | Milliorn | |
| 4,804,937 A | 2/1989 | Barbiaux | |
| 4,809,006 A | 2/1989 | Dar | |
| H610 H | 3/1989 | Focarile | |
| 4,812,852 A | 3/1989 | Bent | |
| 4,818,998 A | 4/1989 | Apsell | |
| 4,819,227 A | 4/1989 | Rosen | |
| 4,823,341 A | 4/1989 | Rosen | |
| 4,825,216 A | 4/1989 | DuFort | |
| 4,827,268 A | 5/1989 | Rosen | |
| 4,831,539 A | 5/1989 | Hagenbuch | |
| 4,831,619 A | 5/1989 | Rosen | |
| 4,833,701 A | 5/1989 | Comroe | |
| 4,837,556 A | 6/1989 | Matsushita | |
| 4,839,656 A | 6/1989 | O'Neill | |
| 4,839,835 A | 6/1989 | Hagenbuch | |
| 4,845,504 A | 7/1989 | Roberts | |
| 4,845,648 A | 7/1989 | Hagenbuch | |
| 4,853,688 A | 8/1989 | Andros | |
| 4,857,915 A | 8/1989 | Andros | |
| 4,864,306 A | 9/1989 | Wiita | |
| 4,866,431 A | 9/1989 | Andros | |
| 4,868,558 A | 9/1989 | Andros | |
| 4,868,562 A | 9/1989 | Andros | |
| 5,005,014 A | 4/1991 | Jasinski | |
| 5,047,763 A | 9/1991 | Kuznicki | |
| 5,109,544 A | 4/1992 | Mittel | |
| 5,111,209 A | 5/1992 | Toriyama | |
| 5,121,115 A | 6/1992 | Andros | |
| 5,124,697 A | 6/1992 | Moore | |
| 5,144,648 A | 9/1992 | Bhagat | |
| 5,151,920 A | 9/1992 | Haagh | |
| 5,151,921 A | 9/1992 | Hashimoto | |
| 5,159,608 A | 10/1992 | Falconer | |
| 5,160,935 A | 11/1992 | Inamiya | |
| 5,185,762 A | 2/1993 | Schilling | |
| 5,187,675 A | 2/1993 | Dent | |
| 5,193,102 A | 3/1993 | Meidan | |
| 5,202,829 A | 4/1993 | Geier | |
| 5,204,874 A | 4/1993 | Falconer | |
| 5,210,770 A | 5/1993 | Rice | |
| 5,216,692 A | 6/1993 | Ling | |
| 5,216,693 A | 6/1993 | Nakamura | |
| 5,218,708 A | 6/1993 | Kanbayashi | |
| 5,220,366 A | 6/1993 | King | |
| 5,223,844 A | 6/1993 | Mansell | |
| 5,224,120 A | 6/1993 | Schilling | |
| 5,224,121 A | 6/1993 | Schorman | |
| 5,224,122 A | 6/1993 | Bruckert | |
| 5,228,054 A | 7/1993 | Rueth | |
| 5,228,056 A | 7/1993 | Schilling | |
| 5,231,646 A | 7/1993 | Heath | |
| 5,235,615 A | 8/1993 | Omura | |
| 5,237,586 A | 8/1993 | Bottomley | |
| 5,239,669 A | 8/1993 | Mason | |
| 5,241,563 A | 8/1993 | Paik | |
| 5,247,702 A | 9/1993 | Su | |
| 5,252,964 A | 10/1993 | Tan | |
| 5,257,028 A | 10/1993 | Keydel | |
| 5,257,397 A | 10/1993 | Barzegar | |
| 5,258,995 A | 11/1993 | Su | |
| 5,263,045 A | 11/1993 | Schilling | |
| 5,268,930 A | 12/1993 | Sendyk | |
| 5,268,933 A | 12/1993 | Averbuch | |
| 5,276,704 A | 1/1994 | Dixon | |
| 5,278,863 A | 1/1994 | Briskman | |
| 5,280,472 A | 1/1994 | Gilhousen | |
| 5,280,498 A | 1/1994 | Tymes | |
| 5,282,222 A | 1/1994 | Fattouche | |
| 5,285,469 A | 2/1994 | Vanderpool | |
| 5,285,472 A | 2/1994 | Leonard | |
| 5,285,496 A | 2/1994 | Frank | |
| 5,291,516 A | 3/1994 | Dixon | |
| 5,293,418 A | 3/1994 | Fukawa | |
| 5,295,152 A | 3/1994 | Gudmundson | |
| 5,295,153 A | 3/1994 | Gudmundson | |
| 5,295,157 A | 3/1994 | Suzuki | |
| 5,297,143 A | 3/1994 | Fridrich | |
| 5,297,161 A | 3/1994 | Ling | |
| 5,299,226 A | 3/1994 | Schilling | |
| 5,303,286 A | 4/1994 | Wiedeman | |
| 5,305,349 A | 4/1994 | Dent | |
| 5,337,041 A | 8/1994 | Friedman | |
| 5,349,632 A | 9/1994 | Nagashima | |
| 5,388,147 A | 2/1995 | Grimes | |
| 5,408,528 A | 4/1995 | Carlson | |
| 5,430,759 A | 7/1995 | Yokev | |
| 5,444,671 A | 8/1995 | Tschannen | |
| 5,479,408 A | 12/1995 | Will | |
| 5,485,163 A | 1/1996 | Singer | |
| 5,491,645 A | 2/1996 | Kennedy | |
| 5,499,032 A | 3/1996 | Kelley | |
| 5,499,266 A | 3/1996 | Yokev | |
| 5,511,233 A | 4/1996 | Otten | |
| 5,512,884 A | 4/1996 | Hesse | |

| | | | | | |
|---|---|---|---|---|---|
| 5,517,618 A | 5/1996 | Wada | 5,815,800 A | 9/1998 | Su |
| 5,519,718 A | 5/1996 | Yokev | RE35,916 E | 10/1998 | Dennison |
| 5,530,438 A | 6/1996 | Bickham | 5,831,545 A | 11/1998 | Murray |
| 5,530,452 A | 6/1996 | Yokev | 5,832,187 A | 11/1998 | Pedersen |
| 5,532,690 A | 7/1996 | Hertel | 5,835,907 A | 11/1998 | Newman |
| 5,543,803 A | 8/1996 | Serfling | 5,838,237 A | 11/1998 | Revell |
| 5,550,551 A | 8/1996 | Alesio | 5,842,125 A | 11/1998 | Modzelesky |
| 5,550,743 A | 8/1996 | Kyrtsos | 5,845,079 A | 12/1998 | Wada |
| 5,551,063 A | 8/1996 | Brandon | 5,850,602 A | 12/1998 | Tisdale |
| 5,552,795 A | 9/1996 | Tayloe | 5,859,576 A | 1/1999 | Winandy |
| 5,583,517 A | 12/1996 | Yokev | 5,862,480 A | 1/1999 | Wild |
| 5,592,173 A | 1/1997 | Lau | 5,862,501 A | 1/1999 | Talbot |
| 5,592,180 A | 1/1997 | Yokev | 5,864,546 A | 1/1999 | Campanella |
| 5,594,425 A | 1/1997 | Ladner | 5,864,764 A | 1/1999 | Thro |
| 5,596,330 A | 1/1997 | Yokev | H1782 H | 2/1999 | Wicks |
| 5,603,079 A | 2/1997 | Olds | 5,867,490 A | 2/1999 | Campanella |
| 5,606,307 A | 2/1997 | Kuan | 5,870,390 A | 2/1999 | Campanella |
| 5,615,110 A | 3/1997 | Wong | 5,870,426 A | 2/1999 | Yokev |
| 5,617,101 A | 4/1997 | Maine | 5,875,182 A | 2/1999 | Hatzipapafotiou |
| 5,625,351 A | 4/1997 | Willard | 5,883,580 A | 3/1999 | Briancon |
| 5,625,668 A | 4/1997 | Loomis | 5,883,594 A | 3/1999 | Lau |
| 5,629,693 A | 5/1997 | Janky | 5,884,172 A | 3/1999 | Sawyer |
| 5,629,855 A | 5/1997 | Kyrtsos | 5,886,635 A | 3/1999 | Landa |
| 5,630,206 A | 5/1997 | Urban | 5,889,473 A | 3/1999 | Wicks |
| 5,630,207 A | 5/1997 | Gitlin | 5,889,492 A | 3/1999 | Kurby |
| 5,636,245 A | 6/1997 | Ernst | 5,894,591 A | 4/1999 | Tamayo |
| 5,646,630 A | 7/1997 | Sheynblat | 5,895,436 A | 4/1999 | Savoie |
| 5,646,632 A | 7/1997 | Khan | 5,897,605 A | 4/1999 | Kohli |
| 5,650,770 A | 7/1997 | Schlager | 5,898,680 A | 4/1999 | Johnstone |
| 5,654,717 A | 8/1997 | Nichols | 5,901,171 A | 5/1999 | Kohli |
| 5,659,601 A | 8/1997 | Cheslog | 5,903,618 A | 5/1999 | Miyake |
| 5,661,652 A | 8/1997 | Sprague | 5,903,837 A | 5/1999 | Wiedeman |
| 5,666,107 A | 9/1997 | Lockhart | 5,903,845 A | 5/1999 | Buhrmann |
| 5,666,661 A | 9/1997 | Grube | 5,907,809 A | 5/1999 | Molnar |
| 5,669,061 A | 9/1997 | Schipper | 5,913,170 A | 6/1999 | Wortham |
| 5,671,247 A | 9/1997 | Souissi | 5,917,405 A | 6/1999 | Joao |
| 5,687,215 A | 11/1997 | Timm | 5,918,159 A | 6/1999 | Fomukong |
| 5,689,245 A | 11/1997 | Noreen | 5,918,176 A | 6/1999 | Arrington, Jr. |
| 5,689,270 A | 11/1997 | Kelley | 5,918,180 A | 6/1999 | Dimino |
| 5,699,244 A | 12/1997 | Clark, Jr. | 5,924,034 A | 7/1999 | Dupuy |
| 5,705,980 A | 1/1998 | Shapiro | 5,926,108 A | 7/1999 | Wicks |
| 5,706,014 A | 1/1998 | Abbasi | 5,926,133 A | 7/1999 | Green, Jr. |
| 5,708,964 A | 1/1998 | Meger | 5,926,467 A | 7/1999 | Hershey |
| 5,724,660 A | 3/1998 | Kauser | 5,926,745 A | 7/1999 | Threadgill |
| 5,726,660 A | 3/1998 | Purdy | 5,929,752 A | 7/1999 | Janky |
| 5,726,663 A | 3/1998 | Moyer | 5,929,753 A | 7/1999 | Montague |
| 5,726,893 A | 3/1998 | Schuchman | 5,930,713 A | 7/1999 | Nguyen |
| 5,729,196 A | 3/1998 | Aljadeff | 5,933,098 A | 8/1999 | Haxton |
| 5,729,457 A | 3/1998 | Seymour | 5,933,431 A | 8/1999 | Ko |
| 5,731,785 A * | 3/1998 | Lemelson et al. ....... 342/357.07 | 5,936,571 A | 8/1999 | Desjardins |
| 5,732,387 A | 3/1998 | Armbruster | 5,937,332 A | 8/1999 | Karabinis |
| 5,734,981 A | 3/1998 | Kennedy, III | 5,938,706 A | 8/1999 | Feldman |
| 5,737,731 A | 4/1998 | Lester | 5,940,764 A | 8/1999 | Mikami |
| 5,742,233 A | 4/1998 | Hoffman | 5,943,689 A | 8/1999 | Tamer |
| 5,742,509 A | 4/1998 | Goldberg | 5,946,603 A | 8/1999 | Ibanez-Meier |
| 5,748,084 A | 5/1998 | Isikoff | 5,946,611 A | 8/1999 | Dennison |
| 5,748,148 A | 5/1998 | Heiser | 5,946,626 A | 8/1999 | Foladare |
| 5,751,246 A | 5/1998 | Hertel | 5,950,137 A | 9/1999 | Kim |
| 5,754,136 A | 5/1998 | Kojima | 5,953,672 A | 9/1999 | Lengdell |
| 5,760,705 A | 6/1998 | Glessner | 5,955,965 A | 9/1999 | Calandruccio |
| 5,771,455 A | 6/1998 | Kennedy, III | 5,956,656 A | 9/1999 | Yamazaki |
| 5,774,829 A | 6/1998 | Cisneros | 5,959,529 A | 9/1999 | Kail, IV |
| 5,781,151 A | 7/1998 | Stratton | 5,959,545 A | 9/1999 | Lhamon |
| 5,784,028 A | 7/1998 | Corman | 5,963,129 A | 10/1999 | Warner |
| 5,787,347 A | 7/1998 | Yu | 5,963,130 A | 10/1999 | Schlager |
| 5,790,073 A | 8/1998 | Tayloe | 5,963,846 A | 10/1999 | Kurby |
| 5,790,938 A | 8/1998 | Talarmo | 5,966,093 A | 10/1999 | Chapman |
| 5,790,956 A | 8/1998 | Lo | 5,966,651 A | 10/1999 | Sibecas |
| 5,790,973 A | 8/1998 | Blaker | 5,966,658 A | 10/1999 | Kennedy, III |
| 5,794,151 A | 8/1998 | McDonald | 5,969,595 A | 10/1999 | Schipper |
| 5,797,091 A | 8/1998 | Clise | 5,973,613 A | 10/1999 | Reis |
| 5,797,134 A | 8/1998 | McMillan | 5,973,643 A | 10/1999 | Hawkes |
| 5,802,453 A | 9/1998 | Kuroki | 5,982,322 A | 11/1999 | Bickley |
| 5,802,468 A | 9/1998 | Gallant | 5,982,323 A | 11/1999 | Czichy |
| 5,805,055 A | 9/1998 | Colizza | 5,982,324 A | 11/1999 | Watters |
| 5,806,005 A | 9/1998 | Hull | 5,982,325 A | 11/1999 | Thornton |
| 5,809,059 A | 9/1998 | Souissi | 5,983,161 A | 11/1999 | Lemelson |
| 5,809,396 A | 9/1998 | Armbruster | 5,990,785 A | 11/1999 | Suda |
| 5,812,086 A | 9/1998 | Bertiger | 5,990,826 A | 11/1999 | Mitchell |

| Patent | Date | Name | Patent | Date | Name |
|---|---|---|---|---|---|
| 5,995,495 A | 11/1999 | Sampson | 6,108,563 A | 8/2000 | Shishino |
| 5,995,804 A | 11/1999 | Rootsey | 6,112,083 A | 8/2000 | Sweet |
| 5,999,088 A | 12/1999 | Sibbitt | 6,112,085 A | 8/2000 | Garner |
| 5,999,124 A | 12/1999 | Sheynblat | 6,114,991 A | 9/2000 | Richton |
| 5,999,125 A | 12/1999 | Kurby | 6,115,366 A | 9/2000 | Campanella |
| 5,999,797 A | 12/1999 | Zancho | 6,115,371 A | 9/2000 | Berstis |
| 5,999,880 A | 12/1999 | Okada | 6,115,605 A | 9/2000 | Siccardo |
| 6,002,936 A | 12/1999 | Roel-Ng | 6,115,754 A | 9/2000 | Landgren |
| 6,005,517 A | 12/1999 | Friedrichs | 6,118,977 A | 9/2000 | Vannucci |
| 6,006,159 A | 12/1999 | Schmier | 6,119,014 A | 9/2000 | Alperovich |
| 6,009,330 A | 12/1999 | Kennedy, III | 6,125,325 A | 9/2000 | Kohli |
| 6,011,510 A | 1/2000 | Yee | 6,128,487 A | 10/2000 | Wiedeman |
| 6,014,080 A | 1/2000 | Layson, Jr. | 6,133,853 A | 10/2000 | Obradovich |
| 6,016,322 A | 1/2000 | Goldman | 6,133,871 A | 10/2000 | Krasner |
| 6,018,313 A | 1/2000 | Engelmayer | 6,134,454 A | 10/2000 | Foladare |
| 6,018,573 A | 1/2000 | Tanaka | 6,137,425 A | 10/2000 | Oster |
| 6,018,652 A | 1/2000 | Frager | 6,138,003 A | 10/2000 | Kingdon |
| 6,018,657 A | 1/2000 | Kennedy, III | 6,138,026 A | 10/2000 | Irvin |
| 6,018,704 A | 1/2000 | Kohli | 6,140,956 A | 10/2000 | Hillman |
| 6,021,330 A | 2/2000 | Vannucci | 6,144,336 A | 11/2000 | Preston |
| 6,023,219 A | 2/2000 | Lee | 6,144,927 A | 11/2000 | Grill |
| 6,023,245 A | 2/2000 | Gomez | 6,147,644 A | 11/2000 | Castles |
| 6,023,606 A | 2/2000 | Monte | 6,148,196 A | 11/2000 | Baumann |
| 6,025,774 A | 2/2000 | Forbes | 6,148,212 A | 11/2000 | Park |
| 6,028,514 A | 2/2000 | Lemelson | 6,148,261 A | 11/2000 | Obradovich |
| 6,028,537 A | 2/2000 | Suman | 6,150,921 A | 11/2000 | Werb |
| 6,029,066 A | 2/2000 | Despres | 6,151,505 A | 11/2000 | Larkins |
| 6,031,467 A | 2/2000 | Hymel | 6,154,172 A | 11/2000 | Piccionelli |
| 6,031,489 A | 2/2000 | Wyrwas | 6,154,656 A | 11/2000 | Camp, Jr. |
| 6,035,202 A | 3/2000 | Camp, Jr. | 6,154,745 A | 11/2000 | Kari |
| 6,038,444 A | 3/2000 | Schipper | 6,157,841 A | 12/2000 | Bolduc |
| 6,038,445 A | 3/2000 | Alperovich | 6,157,896 A | 12/2000 | Castles |
| 6,038,451 A | 3/2000 | Syed | 6,160,994 A | 12/2000 | Wiedeman |
| 6,041,280 A | 3/2000 | Kohli | 6,161,005 A | 12/2000 | Pinzon |
| 6,044,261 A | 3/2000 | Kazmi | 6,161,015 A | 12/2000 | Birchler |
| 6,044,265 A | 3/2000 | Roach, Jr. | 6,166,626 A | 12/2000 | Janky |
| 6,046,687 A | 4/2000 | Janky | 6,167,235 A | 12/2000 | Sibecas |
| 6,047,017 A | 4/2000 | Cahn | 6,167,266 A | 12/2000 | Havinis |
| 6,047,161 A | 4/2000 | Sowles | 6,169,497 B1 | 1/2001 | Robert |
| 6,047,183 A | 4/2000 | Kingdon | 6,169,881 B1 | 1/2001 | Astrom |
| 6,049,711 A | 4/2000 | Ben-Yehezkel | 6,169,902 B1 | 1/2001 | Kawamoto |
| 6,049,718 A * | 4/2000 | Stewart ............... 455/456.4 | 6,173,157 B1 | 1/2001 | Godoroja |
| 6,052,646 A | 4/2000 | Kirkhart | 6,175,308 B1 | 1/2001 | Tallman |
| 6,054,928 A | 4/2000 | Lemelson | 6,178,326 B1 | 1/2001 | Kalliokulju |
| 6,054,934 A | 4/2000 | Cho | 6,184,801 B1 | 2/2001 | Janky |
| 6,055,426 A | 4/2000 | Beasley | 6,184,802 B1 | 2/2001 | Lamb |
| 6,055,434 A | 4/2000 | Seraj | 6,185,265 B1 | 2/2001 | Campanella |
| 6,058,307 A | 5/2000 | Garner | 6,185,409 B1 | 2/2001 | Threadgill |
| 6,059,843 A | 5/2000 | Kirkhart | 6,185,427 B1 | 2/2001 | Krasner |
| 6,061,021 A | 5/2000 | Zibell | 6,188,353 B1 | 2/2001 | Mitchell |
| 6,061,389 A | 5/2000 | Ishifuji | 6,188,911 B1 | 2/2001 | Wallentin |
| 6,061,565 A | 5/2000 | Innes | 6,195,022 B1 | 2/2001 | Yamakita |
| 6,064,943 A | 5/2000 | Clark, Jr. | 6,195,039 B1 | 2/2001 | Glass, Jr. |
| 6,064,970 A | 5/2000 | McMillan | 6,195,555 B1 | 2/2001 | Dent |
| 6,067,007 A | 5/2000 | Gioia | 6,195,557 B1 | 2/2001 | Havinis |
| 6,067,031 A | 5/2000 | Janky | 6,198,390 B1 | 3/2001 | Schlager |
| 6,069,570 A | 5/2000 | Herring | 6,198,765 B1 | 3/2001 | Cahn |
| 6,070,085 A | 5/2000 | Bender | 6,198,930 B1 | 3/2001 | Schipper |
| 6,072,429 A | 6/2000 | Crothall | 6,199,045 B1 | 3/2001 | Giniger |
| 6,072,768 A | 6/2000 | Wiedeman | 6,201,499 B1 | 3/2001 | Hawkes |
| 6,073,004 A | 6/2000 | Balachandran | 6,201,798 B1 | 3/2001 | Campanella |
| 6,073,012 A | 6/2000 | Vanden Heuvel | 6,201,957 B1 | 3/2001 | Son |
| 6,075,458 A | 6/2000 | Ladner | 6,204,813 B1 | 3/2001 | Wadell |
| 6,076,099 A | 6/2000 | Chen | 6,211,907 B1 | 4/2001 | Scaman |
| 6,078,818 A | 6/2000 | Kingdon | 6,219,385 B1 | 4/2001 | Weinberg |
| 6,084,510 A | 7/2000 | Lemelson | 6,219,556 B1 | 4/2001 | Lee |
| 6,084,544 A | 7/2000 | Camp, Jr. | 6,223,044 B1 | 4/2001 | Schultz |
| 6,085,090 A | 7/2000 | Yee | 6,225,901 B1 | 5/2001 | Kail, IV |
| 6,085,148 A | 7/2000 | Jamison | 6,226,522 B1 | 5/2001 | Higuchi |
| 6,087,983 A | 7/2000 | Ho | 6,226,589 B1 | 5/2001 | Maeda |
| 6,091,358 A | 7/2000 | Maniscalco | 6,226,622 B1 | 5/2001 | Dabbiere |
| 6,091,956 A | 7/2000 | Hollenberg | 6,230,097 B1 | 5/2001 | Dance |
| 6,091,957 A | 7/2000 | Larkins | 6,233,432 B1 | 5/2001 | Inukai et al. |
| 6,091,959 A | 7/2000 | Souissi | 6,233,463 B1 | 5/2001 | Wiedeman |
| 6,092,008 A | 7/2000 | Bateman | 6,233,506 B1 | 5/2001 | Obradovich |
| 6,094,168 A | 7/2000 | Duffett-Smith | 6,236,359 B1 | 5/2001 | Watters |
| 6,104,925 A | 8/2000 | Grube | 6,236,365 B1 | 5/2001 | LeBlanc |
| 6,105,060 A | 8/2000 | Rothblatt | 6,236,858 B1 | 5/2001 | Griffith |
| 6,108,319 A | 8/2000 | Campanella | 6,236,937 B1 | 5/2001 | Kohli |

| Patent No. | Date | Name |
|---|---|---|
| 6,240,295 B1 | 5/2001 | Kennedy, III |
| 6,243,587 B1 | 6/2001 | Dent |
| 6,249,217 B1 | 6/2001 | Forbes |
| 6,249,245 B1 | 6/2001 | Watters |
| 6,249,246 B1 | 6/2001 | Bode |
| 6,249,252 B1 | 6/2001 | Dupray |
| 6,249,514 B1 | 6/2001 | Campanella |
| 6,249,542 B1 | 6/2001 | Kohli |
| 6,253,069 B1 | 6/2001 | Mankovitz |
| 6,255,942 B1 | 7/2001 | Knudsen |
| 6,255,988 B1 | 7/2001 | Bischoff |
| 6,256,475 B1 | 7/2001 | Vannucci |
| 6,256,503 B1 | 7/2001 | Stephens |
| 6,256,504 B1 | 7/2001 | Tell |
| 6,262,764 B1 | 7/2001 | Perterson |
| 6,266,014 B1 | 7/2001 | Fattouche |
| 6,266,617 B1 | 7/2001 | Evans |
| 6,268,804 B1 | 7/2001 | Janky |
| 6,269,250 B1 | 7/2001 | Bender |
| 6,271,788 B1 | 8/2001 | Longaker |
| 6,272,338 B1 | 8/2001 | Modzelesky |
| 6,272,339 B1 | 8/2001 | Wiedeman |
| 6,272,341 B1 | 8/2001 | Threadgill |
| 6,275,164 B1 | 8/2001 | MacConnell |
| 6,275,773 B1 | 8/2001 | Lemelson |
| 6,281,837 B1 | 8/2001 | Richton |
| 6,282,231 B1 | 8/2001 | Norman |
| 6,282,495 B1 | 8/2001 | Kirkhart |
| 6,285,281 B1 | 9/2001 | Gatto |
| 6,289,279 B1 | 9/2001 | Ito |
| 6,289,331 B1 | 9/2001 | Pedersen |
| 6,292,749 B2 | 9/2001 | Kohli |
| 6,295,449 B1 | 9/2001 | Westerlage |
| 6,295,454 B1 | 9/2001 | Havinis |
| 6,297,768 B1 | 10/2001 | Allen, Jr. |
| 6,298,243 B1 | 10/2001 | Basile |
| 6,298,306 B1 | 10/2001 | Suarez |
| 6,300,902 B1 | 10/2001 | Eslambolchi |
| 6,304,216 B1 | 10/2001 | Gronemeyer |
| 6,304,746 B1 | 10/2001 | Fascenda |
| 6,304,757 B1 | 10/2001 | Larsson |
| 6,310,944 B1 | 10/2001 | Brisebois |
| 6,311,128 B1 | 10/2001 | Prum |
| 6,314,290 B1 | 11/2001 | Joshi |
| 6,320,535 B1 | 11/2001 | Hillman |
| 6,321,090 B1 | 11/2001 | Soliman |
| 6,321,092 B1 | 11/2001 | Fitch |
| 6,324,404 B1 | 11/2001 | Dennison |
| 6,327,471 B1 | 12/2001 | Song |
| 6,327,570 B1 | 12/2001 | Stevens |
| 6,330,454 B1 | 12/2001 | Verdonk |
| 6,331,825 B1 | 12/2001 | Ladner |
| 6,333,922 B1 | 12/2001 | Campanella |
| 6,342,854 B1 | 1/2002 | Duffett-Smith |
| 6,343,205 B1 | 1/2002 | Threadgill |
| 6,345,181 B1 | 2/2002 | Janhonen |
| 6,347,216 B1 | 2/2002 | Marko |
| 6,347,281 B1 | 2/2002 | Litzsinger |
| 6,348,744 B1 | 2/2002 | Levesque |
| 6,351,641 B2 | 2/2002 | Verkama |
| 6,353,738 B1 | 3/2002 | Joshi |
| 6,353,781 B1 | 3/2002 | Spivak |
| 6,360,102 B1 | 3/2002 | Havinis |
| 6,366,780 B1 | 4/2002 | Obhan |
| 6,371,416 B1 | 4/2002 | Hawthorne |
| 6,374,169 B1 | 4/2002 | Demay |
| 6,377,795 B1 | 4/2002 | Bach |
| 6,381,324 B1 | 4/2002 | Shaffer |
| 6,381,464 B1 | 4/2002 | Vannucci |
| 6,385,312 B1 | 5/2002 | Shaffer |
| 6,388,579 B1 | 5/2002 | Adcox |
| 6,388,612 B1 | 5/2002 | Neher |
| 6,388,617 B1 | 5/2002 | Flood |
| 6,389,298 B1 | 5/2002 | Abramovici |
| 6,393,046 B1 | 5/2002 | Kohli |
| 6,397,040 B1 | 5/2002 | Titmuss |
| 6,397,133 B1 | 5/2002 | van der Pol |
| 6,400,314 B1 | 6/2002 | Krasner |
| 6,400,753 B1 | 6/2002 | Kohli |
| 6,400,943 B1 | 6/2002 | Montoya |
| 6,401,032 B1 | 6/2002 | Jamison |
| 6,405,213 B1 | 6/2002 | Layson |
| 6,411,806 B1 | 6/2002 | Garner |
| 6,418,319 B1 | 7/2002 | Dent |
| 6,421,009 B2 | 7/2002 | Suprunov |
| 6,421,609 B2 | 7/2002 | Kohli |
| 6,424,831 B1 | 7/2002 | Schiff |
| 6,424,840 B1 | 7/2002 | Fitch |
| 6,430,496 B1 | 8/2002 | Smith |
| 6,434,381 B1 | 8/2002 | Moore |
| 6,437,696 B1 | 8/2002 | Lemelson |
| 6,438,465 B2 | 8/2002 | Obradovich |
| 6,441,752 B1 | 8/2002 | Fomukong |
| 6,442,391 B1 | 8/2002 | Johansson |
| 6,442,485 B2 | 8/2002 | Evans |
| D462,284 S | 9/2002 | Womack |
| 6,448,895 B1 | 9/2002 | Ekkel |
| 6,448,925 B1 | 9/2002 | Shridhara |
| 6,456,621 B1 | 9/2002 | Wada |
| 6,456,840 B1 | 9/2002 | Uda |
| 6,462,671 B2 | 10/2002 | Bushner |
| 6,463,272 B1 | 10/2002 | Wallace |
| 6,463,288 B1 | 10/2002 | Havinis |
| 6,466,569 B1 | 10/2002 | Wright |
| 6,466,612 B2 | 10/2002 | Kohli |
| 6,466,788 B1 | 10/2002 | Carlsson |
| 6,472,976 B1 | 10/2002 | Wohl |
| 6,473,031 B1 | 10/2002 | Harris |
| 6,476,763 B2 | 11/2002 | Allen, Jr. |
| 6,477,370 B1 | 11/2002 | Sigler |
| 6,477,581 B1 | 11/2002 | Carpenter |
| 6,477,667 B1 | 11/2002 | Levi |
| 6,480,147 B2 | 11/2002 | Durst |
| 6,483,427 B1 | 11/2002 | Werb |
| 6,483,456 B2 | 11/2002 | Huisken |
| 6,484,029 B2 | 11/2002 | Hughes |
| 6,484,035 B2 | 11/2002 | Allen, Jr. |
| 6,487,500 B2 | 11/2002 | Lemelson |
| 6,493,338 B1 | 12/2002 | Preston |
| 6,496,145 B2 | 12/2002 | Gronemeyer |
| 6,496,702 B1 | 12/2002 | Lockhart |
| 6,498,565 B2 | 12/2002 | Boulay |
| 6,504,491 B1 | 1/2003 | Christians |
| 6,504,634 B1 | 1/2003 | Chan |
| 6,505,100 B1 | 1/2003 | Stuempfle |
| 6,509,830 B1 | 1/2003 | Elliott |
| 6,510,380 B1 | 1/2003 | Curatolo |
| 6,515,595 B1 | 2/2003 | Obradovich |
| 6,515,619 B1 | 2/2003 | McKay, Jr. |
| 6,516,065 B1 | 2/2003 | Joshi |
| 6,516,190 B1 | 2/2003 | Linkola |
| 6,518,889 B2 | 2/2003 | Schlager |
| 6,519,277 B2 | 2/2003 | Eidson |
| 6,519,463 B2 | 2/2003 | Tendler |
| 6,522,265 B1 | 2/2003 | Hillman |
| 6,522,682 B1 | 2/2003 | Kohli |
| 6,522,889 B1 | 2/2003 | Aarnio |
| 6,525,768 B2 | 2/2003 | Obradovich |
| 6,526,335 B1 | 2/2003 | Treyz |
| 6,529,159 B1 | 3/2003 | Fan |
| 6,529,165 B1 | 3/2003 | Duffett-Smith |
| 6,529,731 B2 | 3/2003 | Modzelesky |
| 6,529,824 B1 | 3/2003 | Obradovich |
| 6,531,982 B1 | 3/2003 | White |
| 6,532,360 B1 | 3/2003 | Shaffer |
| 6,535,125 B2 | 3/2003 | Trivett |
| 6,539,230 B2 | 3/2003 | Yen |
| 6,542,076 B1 | 4/2003 | Joao |
| 6,542,077 B2 | 4/2003 | Joao |
| 6,542,480 B1 | 4/2003 | Campanella |
| 6,542,716 B1 | 4/2003 | Dent |
| 6,542,739 B1 | 4/2003 | Garner |
| 6,542,795 B2 | 4/2003 | Obradovich |
| 6,545,995 B1 | 4/2003 | Kinnunen |
| 6,546,360 B1 | 4/2003 | Gilbert |
| 6,549,130 B1 | 4/2003 | Joao |
| 6,552,654 B1 | 4/2003 | Gharb |
| 6,553,009 B2 | 4/2003 | Artzi |

| Patent | Date | Name |
|---|---|---|
| 6,553,236 B1 | 4/2003 | Dunko |
| 6,553,336 B1 | 4/2003 | Johnson |
| 6,556,819 B2 | 4/2003 | Irvin |
| 6,556,831 B1 | 4/2003 | Buppelmann |
| 6,556,981 B2 | 4/2003 | Pedersen |
| 6,559,620 B2 | 5/2003 | Zhou |
| 6,560,461 B1 | 5/2003 | Fomukong |
| 6,560,604 B1 | 5/2003 | Fascenda |
| 6,563,427 B2 | 5/2003 | Bero |
| 6,564,037 B1 | 5/2003 | Sweatman |
| 6,567,116 B1 | 5/2003 | Aman |
| 6,567,670 B1 | 5/2003 | Petersson |
| 6,570,975 B2 | 5/2003 | Shaffer |
| 6,571,168 B1 | 5/2003 | Murphy |
| 6,571,286 B2 | 5/2003 | Fisher |
| 6,574,558 B2 | 6/2003 | Kohli |
| 6,577,271 B1 | 6/2003 | Gronemeyer |
| 6,580,664 B2 | 6/2003 | Magnusson |
| 6,584,312 B1 | 6/2003 | Morin |
| 6,584,331 B2 | 6/2003 | Ranta |
| 6,587,046 B2 | 7/2003 | Joao |
| 6,587,634 B2 | 7/2003 | Maltz |
| 6,590,525 B2 | 7/2003 | Yule |
| 6,590,534 B1 | 7/2003 | Kroll |
| 6,591,112 B1 | 7/2003 | Siccardo |
| 6,593,851 B1 | 7/2003 | Bornstein |
| 6,594,043 B1 | 7/2003 | Bloom |
| 6,594,500 B2 | 7/2003 | Bender |
| 6,597,890 B1 | 7/2003 | Sibecas |
| 6,600,444 B2 | 7/2003 | Desjardins |
| 6,605,114 B1 | 8/2003 | Yan |
| 6,606,349 B1 | 8/2003 | Kudhrethaya |
| 6,606,556 B2 | 8/2003 | Curatolo |
| 6,608,559 B1 | 8/2003 | Lemelson |
| 6,608,892 B2 | 8/2003 | Shaffer |
| 6,611,686 B1 | 8/2003 | Smith |
| 6,611,688 B1 | 8/2003 | Raith |
| 6,621,422 B2 | 9/2003 | Rubenstein |
| 6,624,609 B1 | 9/2003 | Allen |
| 6,628,928 B1 | 9/2003 | Crosby |
| 6,628,944 B1 | 9/2003 | Jeong |
| 6,633,814 B2 | 10/2003 | Kohli |
| 6,636,175 B2 | 10/2003 | Russell |
| 6,636,178 B2 | 10/2003 | Gronemeyer |
| 6,636,721 B2 | 10/2003 | Threadgill |
| 6,636,983 B1 | 10/2003 | Levi |
| 6,643,516 B1 | 11/2003 | Stewart |
| 6,647,257 B2 | 11/2003 | Owensby |
| 6,654,362 B1 | 11/2003 | Palamara |
| 6,657,549 B1 | 12/2003 | Avery |
| 6,657,587 B1 | 12/2003 | Mohan |
| 6,658,250 B1 | 12/2003 | Ganesan |
| 6,658,585 B1 | 12/2003 | Levi |
| 6,658,586 B1 | 12/2003 | Levi |
| 6,661,884 B2 | 12/2003 | Shaffer |
| 6,664,893 B1 | 12/2003 | Eveland |
| 6,665,385 B2 | 12/2003 | Rogers |
| 6,665,613 B2 | 12/2003 | Duvall |
| 6,668,173 B2 | 12/2003 | Greene |
| RE38,378 E | 1/2004 | Montague |
| 6,678,341 B1 | 1/2004 | Miyake |
| 6,680,919 B1 | 1/2004 | Rauhala |
| 6,681,121 B1 | 1/2004 | Preston |
| 6,690,681 B1 | 2/2004 | Preston |
| 6,693,953 B2 | 2/2004 | Cox |
| 6,694,136 B2 | 2/2004 | Uda |
| 6,694,177 B2 | 2/2004 | Eggers |
| 6,694,248 B2 | 2/2004 | Smith |
| 6,696,922 B1 | 2/2004 | Wong |
| 6,700,534 B2 | 3/2004 | Harris |
| 6,701,144 B2 | 3/2004 | Kirbas |
| 6,703,936 B2 | 3/2004 | Hill |
| 6,704,543 B1 | 3/2004 | Sharon |
| 6,707,424 B1 | 3/2004 | Snyder |
| 6,707,487 B1 | 3/2004 | Aman |
| 6,708,033 B1 | 3/2004 | Linkola |
| 6,710,738 B2 | 3/2004 | Allen, Jr. |
| 6,711,408 B1 | 3/2004 | Raith |
| 6,711,474 B1 | 3/2004 | Treyz |
| 6,711,500 B2 | 3/2004 | Chen |
| 6,714,158 B1 | 3/2004 | Underbrink |
| 6,714,759 B2 | 3/2004 | Perry |
| 6,716,101 B1 | 4/2004 | Meadows |
| 6,720,864 B1 | 4/2004 | Wong |
| 6,720,879 B2 | 4/2004 | Edwards |
| 6,725,049 B1 | 4/2004 | Williams |
| 6,735,444 B2 | 5/2004 | Wingren |
| 6,747,961 B1 | 6/2004 | Ahmed |
| 6,748,226 B1 | 6/2004 | Wortham |
| 6,750,818 B2 | 6/2004 | Thomas |
| 6,751,442 B1 | 6/2004 | Barrett |
| 6,751,467 B1 | 6/2004 | Cameron |
| 6,753,782 B2 | 6/2004 | Power |
| 6,756,917 B2 | 6/2004 | Gould |
| 6,756,918 B2 | 6/2004 | Fomukong |
| 6,756,938 B2 | 6/2004 | Zhao |
| 6,757,534 B2 | 6/2004 | Bach |
| 6,760,364 B2 | 7/2004 | Kohli |
| 6,763,232 B1 | 7/2004 | Odorfer |
| 6,765,497 B2 | 7/2004 | Ablay |
| 6,768,909 B1 | 7/2004 | Irvin |
| 6,771,971 B2 | 8/2004 | Smith |
| 6,778,136 B2 | 8/2004 | Gronemeyer |
| 6,782,253 B1 | 8/2004 | Shteyn |
| RE38,600 E | 9/2004 | Mankovitz |
| 6,788,655 B1 | 9/2004 | Underbrink |
| 6,788,735 B2 | 9/2004 | Kohli |
| 6,799,094 B1 | 9/2004 | Vaida |
| 6,801,137 B2 | 10/2004 | Eggers |
| 6,806,814 B1 | 10/2004 | Iverson |
| 6,807,158 B2 | 10/2004 | Krishnamurthy |
| 6,809,659 B2 | 10/2004 | Flick |
| 6,812,824 B1 | 11/2004 | Goldinger |
| 6,813,487 B1 | 11/2004 | Trommelen |
| 6,813,498 B1 | 11/2004 | Durga |
| 6,819,919 B1 | 11/2004 | Tanaka |
| 6,826,460 B2 | 11/2004 | Kittell |
| 6,828,908 B2 | 12/2004 | Clark |
| 6,828,936 B2 | 12/2004 | Odashima |
| 6,829,221 B1 | 12/2004 | Winckles |
| 6,833,787 B1 | 12/2004 | Levi |
| 6,834,164 B1 | 12/2004 | Chan |
| 6,836,658 B1 | 12/2004 | Sharon |
| 6,839,542 B2 | 1/2005 | Sibecas |
| 6,844,845 B1 | 1/2005 | Whiteside |
| 6,847,822 B1 | 1/2005 | Dennison |
| 6,847,892 B2 | 1/2005 | Zhou |
| 6,850,497 B1 | 2/2005 | Sigler |
| 6,850,600 B1 | 2/2005 | Boeckman |
| 6,853,711 B2 | 2/2005 | Brisebois |
| 6,853,849 B1 | 2/2005 | Tognazzini |
| 6,856,945 B2 | 2/2005 | Thomas |
| 6,859,134 B1 | 2/2005 | Heiman |
| 6,859,171 B2 | 2/2005 | Durst |
| 6,859,172 B2 | 2/2005 | Powers |
| 6,859,687 B2 | 2/2005 | Obradovich |
| 6,868,270 B2 | 3/2005 | Dent |
| 6,868,386 B1 | 3/2005 | Henderson |
| 6,871,215 B2 | 3/2005 | Smith |
| 6,876,853 B2 | 4/2005 | Hokkanen |
| 6,882,837 B2 | 4/2005 | Fernandez |
| 6,885,846 B1 | 4/2005 | Panasik |
| 6,886,060 B2 | 4/2005 | Wang |
| 6,888,811 B2 | 5/2005 | Eaton |
| 6,889,135 B2 | 5/2005 | Curatolo |
| 6,891,811 B2 | 5/2005 | Smith |
| 6,903,681 B2 | 6/2005 | Faris |
| 6,904,270 B1 | 6/2005 | Chan |
| 6,915,208 B2 | 7/2005 | Garin |
| 6,917,644 B2 | 7/2005 | Cahn |
| 6,920,124 B2 | 7/2005 | Lappe |
| 6,920,322 B2 | 7/2005 | Ikeda |
| 6,922,616 B2 | 7/2005 | Obradovich |
| 6,924,748 B2 | 8/2005 | Obradovich |
| 6,928,468 B2 | 8/2005 | Leermakers |
| 6,931,055 B1 | 8/2005 | Underbrink |
| 6,931,232 B1 | 8/2005 | Wolcott |
| 6,931,233 B1 | 8/2005 | Tso |

| Patent No. | Date | Name |
|---|---|---|
| 6,933,840 B2 | 8/2005 | Cariffe |
| 6,933,846 B2 | 8/2005 | Moldavsky |
| 6,940,403 B2 | 9/2005 | Kail |
| 6,941,129 B2 | 9/2005 | Marce |
| 6,943,703 B2 | 9/2005 | Rubenstein |
| 6,947,398 B1 | 9/2005 | Ahmed |
| 6,950,013 B2 | 9/2005 | Scaman |
| RE38,838 E | 10/2005 | Taylor |
| 6,952,181 B2 | 10/2005 | Karr |
| 6,952,440 B1 | 10/2005 | Underbrink |
| 6,952,646 B2 | 10/2005 | Chang |
| 6,954,630 B2 | 10/2005 | Offer |
| 6,956,467 B1 | 10/2005 | Mercado |
| 6,957,107 B2 | 10/2005 | Rogers |
| 6,957,393 B2 | 10/2005 | Fano |
| 6,961,660 B2 | 11/2005 | Underbrink |
| 6,965,297 B1 | 11/2005 | Sandahl |
| 6,968,737 B2 | 11/2005 | Chen |
| 6,980,636 B2 | 12/2005 | Fleischer |
| 6,980,813 B2 | 12/2005 | Mohi |
| 6,983,146 B2 | 1/2006 | Spratt |
| 6,985,742 B1 | 1/2006 | Giniger |
| 6,985,746 B2 | 1/2006 | Gorsuch |
| 6,992,582 B2 | 1/2006 | Hill |
| 6,992,583 B2 | 1/2006 | Muramatsu |
| 6,998,959 B2 | 2/2006 | Lund |
| 6,999,716 B1 | 2/2006 | Andre |
| 6,999,779 B1 | 2/2006 | Hashimoto |
| 7,000,116 B2 | 2/2006 | Bates |
| 7,002,468 B2 | 2/2006 | Eveland |
| 7,002,516 B2 | 2/2006 | Gronemeyer |
| 7,003,278 B2 | 2/2006 | Beni |
| 7,003,322 B2 | 2/2006 | Judd |
| 7,006,835 B2 | 2/2006 | Otsuka |
| 7,009,555 B2 | 3/2006 | Tsujimoto |
| 7,010,308 B2 | 3/2006 | Hendrey |
| 7,020,103 B1 | 3/2006 | Refai |
| 7,020,104 B2 | 3/2006 | Bay |
| 7,020,217 B1 | 3/2006 | Parsons |
| 7,024,205 B1 | 4/2006 | Hose |
| 7,024,211 B1 | 4/2006 | Martin |
| 7,024,331 B2 | 4/2006 | Jones |
| 7,026,957 B2 | 4/2006 | Rubenstein |
| 7,027,773 B1 | 4/2006 | McMillin |
| 7,027,815 B2 | 4/2006 | Sendonaris |
| 7,031,272 B2 | 4/2006 | Campanella |
| 7,031,655 B2 | 4/2006 | Nomura |
| 7,031,711 B2 | 4/2006 | Soliman |
| 7,031,945 B1 | 4/2006 | Donner |
| 7,039,424 B2 | 5/2006 | Gorsuch |
| 7,040,538 B2 | 5/2006 | Patel |
| 7,043,204 B2 | 5/2006 | Reagor |
| 7,043,241 B1 | 5/2006 | Sladek |
| 7,043,270 B2 | 5/2006 | Judd |
| 7,046,120 B2 | 5/2006 | Lund |
| 7,047,024 B2 | 5/2006 | Shintai |
| 7,049,981 B2 | 5/2006 | Behr |
| 7,050,818 B2 | 5/2006 | Tendler |
| 7,053,824 B2 | 5/2006 | Abraham |
| 7,054,432 B2 | 5/2006 | Sabinson |
| 7,061,385 B2 | 6/2006 | Fong |
| 7,062,279 B2 | 6/2006 | Cedervall |
| 7,062,286 B2 | 6/2006 | Grivas |
| 7,062,362 B2 | 6/2006 | Obradovich |
| 7,062,778 B1 | 6/2006 | Pattersson |
| 7,065,886 B2 | 6/2006 | Segur |
| 7,068,994 B2 | 6/2006 | Van Camp |
| 7,069,018 B1 | 6/2006 | Granstam |
| 7,069,026 B2 | 6/2006 | McClure |
| 7,069,319 B2 | 6/2006 | Zellner |
| 7,076,257 B2 | 7/2006 | Kall |
| 7,079,551 B2 | 7/2006 | Shivnan |
| 7,080,402 B2 | 7/2006 | Bates |
| 7,085,555 B2 | 8/2006 | Zellner |
| 7,091,882 B2 | 8/2006 | Doyle |
| 7,092,367 B2 | 8/2006 | Kawai |
| 7,092,704 B2 | 8/2006 | Hosono |
| 7,104,851 B1 | 9/2006 | Gonring |
| 7,106,211 B2 | 9/2006 | Duvall |
| 7,107,038 B2 | 9/2006 | Fitch |
| 7,110,401 B2 | 9/2006 | Wada |
| 7,110,749 B2 | 9/2006 | Zellner |
| 7,110,772 B1 | 9/2006 | Wu |
| 7,110,773 B1 | 9/2006 | Wallace |
| 7,113,126 B2 | 9/2006 | Durst |
| 7,113,493 B1 | 9/2006 | Bush |
| 7,113,797 B2 | 9/2006 | Kelley |
| 7,113,864 B2 | 9/2006 | Smith |
| 7,116,704 B2 | 10/2006 | Norman |
| 7,116,911 B2 | 10/2006 | Bloom |
| 7,116,977 B1 | 10/2006 | Moton |
| 7,120,449 B1 | 10/2006 | Muhonen |
| 7,120,921 B1 | 10/2006 | Ito |
| 7,127,264 B2 | 10/2006 | Hronek |
| 7,130,290 B2 | 10/2006 | Wada |
| 7,130,396 B2 | 10/2006 | Rogers |
| 7,130,584 B2 | 10/2006 | Hirvonen |
| 7,130,630 B1 | 10/2006 | Enzmann |
| 7,133,685 B2 | 11/2006 | Hose |
| 7,136,473 B2 | 11/2006 | Gruchala |
| 7,136,474 B2 | 11/2006 | Shaffer |
| 7,139,557 B2 | 11/2006 | Tang |
| 7,139,582 B2 | 11/2006 | Couronne |
| 7,148,802 B2 | 12/2006 | Abbruscato |
| 7,151,768 B2 | 12/2006 | Preston |
| 7,155,340 B2 | 12/2006 | Churan |
| 7,161,622 B1 | 1/2007 | Oinoue |
| 7,162,199 B1 | 1/2007 | Glickstein |
| 7,162,454 B1 | 1/2007 | Donner |
| 7,167,454 B2 | 1/2007 | Caldwell |
| 7,167,553 B2 | 1/2007 | Shaffer |
| 7,170,445 B2 | 1/2007 | Thiel |
| 7,170,518 B1 | 1/2007 | Millington |
| 7,171,187 B2 | 1/2007 | Haave |
| 7,171,221 B1 | 1/2007 | Amin |
| 7,180,427 B2 | 2/2007 | Meyer |
| 7,180,873 B1 | 2/2007 | Monte |
| 7,181,160 B2 | 2/2007 | Barrett |
| 7,181,225 B1 | 2/2007 | Moton, Jr. |
| 7,181,228 B2 | 2/2007 | Boesch |
| RE39,526 E | 3/2007 | Hull |
| 7,196,621 B2 | 3/2007 | Kochis |
| 7,199,726 B2 | 4/2007 | Fomukong |
| 7,200,183 B2 | 4/2007 | Olson |
| 7,200,387 B1 | 4/2007 | Ephraim |
| 7,203,300 B2 | 4/2007 | Shaffer |
| 7,203,302 B2 | 4/2007 | Sabinson |
| 7,203,665 B2 | 4/2007 | Donner |
| 7,203,752 B2 | 4/2007 | Rice |
| 7,206,305 B2 | 4/2007 | Preston |
| 7,206,849 B1 | 4/2007 | Gernert |
| 2006/0025158 A1* | 2/2006 | Leblanc et al. ............ 455/456.2 |

OTHER PUBLICATIONS

William G Toperzer; An Advanced Driver Information System Concept And Its Communications Considerations; Toperzer—An Advanced Driver Information.pdf; Position Location and Navigation Symposium, 1990. Record. apos;The 1990apos;s—A Decade of Excellence in the Navigation Sciencesapos;. IEEE Plans apos;90., IEEE, Volume , Issue , Mar. 20-23, 1990 pp. 364-369.

CJ Driscoll and Associates; Survey Of Location Technologies To Support Mobile 9-1-1; Driscoll—Survey of Location Technologies. pdf; Survey Conducted for State of California Department of General Services Telecommunications Division, Sacramento, California and for the Association of Public Safety Communications Officials (APCO) Jul. 1994.

Federal Communications Commission; In The Matter Of Revision Of The Commission's Rules To Ensure Compatibility With Enhanced 911 Emergency Calling Systems; FCC—In the Matter of Revision—1994.pdf; 9 F.C.C.R. 6170,9 FCC Rcd. 6170,3 Communications Reg. (P&F) 2193, 1994 WL 721857 (F.C.C.).

Federal Communications Commission; In The Matter Of Revision Of The Commission's Rules To Ensure Compatibility With Enhanced 911 Emergency Calling Systems; FCC—In the Matter of Revision—1996.pdf; Federal Communications Commission FCC 96-264.

Office of Technology Assessment, U.S Congress; Wireless Technologies And The National Information Infrastructure; Wireless Technologies National Info Infrastructure.pdf OTA-ITC-622 GPO stock #052-003-01421-1 Sep. 1995.

Kevin G. Hegebarth; ANI is The Key To Unlock Advanced Network Services; Hegebarth—ANI Is the Key.pdf Telephonu/Nov. 14, 1988.

Defendant Nextel; Nextel of California, Inc., et al.'s Memorandum of Points and Authorities in Support of Motion for Summary Judgment of Unenforceability and Invalidity Under 35 U.S.C. §102(f) for Incorrect Inventorship.

Plaintiff Enovsys; Plaintiff Enovsys' Memorandum of Points and Authorities in Opposition to Defendants Motion for Summary Judgment of Unenforceability and Invalidity Under 35 U.S.C. §102(f); 206-P'sopptoMSJofunenforce&invalid102f.pdf United States District Court Central District of California; Case No. CV 06-5306-RSWL (SHx).

Plaintiff Enovsys; Declaration of Mundi Fomukong in Opposition to Defendants Motion for Summary Judgment of Unenforceability and Invalidity Under 35 U.S.C. §102(f) for Incorrect Inventorship; 208-FomukongdeclinopptoMSJunenforce&invalid102f.pdf.

Plaintiff Enovsys; Declaration of Denzil Chesney in Opposition to Defendants Motion for Summary Judgment of Unenforceability and Invalidity Under 35 U.S.C. §102(f) for Incorrect Inventorship; 209-ChesneydeclinopptoMSJunenforce&invalid102f.pdf United States District Court Central District of California; Case No. CV 06-5306-RSWL (SHx).

Defendant Nextel; Nextel of California, Inc., et al.'s Reply Brief in Support of Motion for Summary Judgment of Unenforceability and Invalidity Under 35 U.S.C. §102(f) for Incorrect Inventorship; 224-1NextelCAreplyMSJincorrectinventor102f.pdf; United States District Court Central District of California; Case No. CV 06-5306-RSWL (SHx).

United States District Court Central District of California; Court Order for Defendant/Countercliamant Nextel of California, Inc., et al.'s Motion for Summary Judgment of Unenforceability and Invalidity Under 35 U.S.C. §102(f) for Incorrect Inventorship; 260-OrderreDefs'MSJInvalidity'unenforce102f.pdf.

Defendant Nextel; Nextel of California, Inc., et al.'s Memorandum of Points and Authorities in Support of Motion for Summary Judgment of Invalidity Under 35 U.S.C. §§102 and 103; 138-2Def'smotionforinvalidityunder102and103.pdf United States District Court Central District of California; Case No. CV 06-5306-RSWL (SHx).

Plaintiff Enovsys; Plaintiff Enovsys' Memorandum of Points and Authorities in Opposition to Defendants Motion for Summary Judgment of Invalidity Under Section 102 and 103; 199-P'sopptoMSJifinvaliditysect102&103.pdf United States District Court Central District of California; Case No. CV 06-5306-RSWL (SHx).

Plaintiff Enovsys; Declaration of Christopher Rose, Phd in Opposition to Defendants Motion for Summary Judgment of Invalidity Under Section 102 and 103; 201-1RoseDeclinopptoMSJofinvalidity102&103.pdf United States District Court Central District of California; Case No. CV 06-5306-RSWL (SHx).

Defendant Nextel; Nextel of California, Inc., et al.'s Reply Brief in Support of Motion for Summary Judgment of Invalidity Under 35 U.S.C. §§102 and 103; 227-NextelCAreplyMSJinvalidity102&103.pdf United States District Court Central District of California; Case No. CV 06-5306-RSWL (SHx).

Defendant Nextel; Nextel of California, Inc., et al.'s Supplemental Briefing in Support of Summary Judgment Motions and Opposition; 268-Nextelsuppmemoresumjudg102&103.pdf United States District Court Central District of California; Case No. CV 06-5306-RSWL (SHx).

Plaintiff Enovsys; Plaintiff Enovsys' Supplemental Memorandum of Points and Authorities Re Pending Summary Judgement Motions; 269-PlaintiffssuppmemoreMSJs.pdf United States District Court Central District of California; Case No. CV 06-5306-RSWL (SHx).

Plaintiff Enovsys; Plaintiff Enovsys' Notice of Motion and Motion for Partial Summary Judgement on Defendants Affirmative Defense and Counterclaim that the Patents-In-Suit are Invalid Under Section 102; 146-P'sMSJre102.pdf.

Defendant Nextel; Nextel of California, Inc., et al.'s Memorandum of Points and Authorities in Opposition to Enovsys' Motion for Partial Summary Judgment Re Invalidity Under Section 102; 197-NextelopprepartialMSJreinvaliditysect102.pdf United States District Court Central District of California; Case No. CV 06-5306-RSWL (SHx).

Plaintiff Enovsys; Reply Brief in Support of Plaintiff Enovsys' Motion for Partial Summary Judgement on Defendants Affirmative Defense and Counterclaim that the Patents-In-Suit are Invalid Under Section 102; 230-P'sreplypartialMSJ.pdf.

United States District Court Central District of California; Court Order on Motion for Summary Judgement of Invalidity under 35 USC 102 and 103; 286-orderresummaryjudgments.pdf United States District Court Central District of California; Case No. CV 06-5306-RSWl (SHx).

Plaintiff Enovsys; Plaintiff Enovsys' [Corrected] Opening Claim Construction Brief 152-correctclaimconstructionbrief.pdf; United States District Court Central District of California; Case No. CV 06-5306-RSWL (SHx).

Plaintiff Enovsys; Exhibit 3 to Declaration of Jeff Eichmann in Support of Plaintiff Enovsys' Opening Claim Construction Brief; 137-4(Exhibit3toClaimconstructionbrief).pdf; United States District Court Central District of California; Case No. CV 06-5306-RSWL (SHx).

Defendant Nextel; Nextel of California, Inc., et al.'s Brief in Support of Defendant'S Proposed Claim Construction 195-1Nextelproposedclaimconstruction.pdf; United States District Court Central District of California; Case No. CV 06-5306-RSWL (SHx).

Plaintiff Enovsys; Plaintiff Enovsys' Reply Claim Construction Brief; 228-P'sreplyreclaimconstruction.pdf; United States District Court Central District of California; Case No. CV 06-5306-RSWL (SHx).

Defendant Nextel; Nextel of California, Inc., et al.'s Sur-Reply in Support of Defendant's Proposed Claim Construction 238-1Nextelsurreplyreclmconst.pdf; United States District Court Central District of California; Case No. CV 06-5306-RSWL (SHx).

United States District Court Central District of California; Court Order on Claim Construction 261-ClaimConstorder.pdf United States District Court Central District of California; Case No. CV 06-5306-RSWL (SHx).

* cited by examiner

AUTHORIZED LOCATION REPORTING MOBILE COMMUNICATION SYSTEM

CROSS-REFERENCE TO RELATED APPLICATIONS

This application is a continuation of U.S. application Ser. No. 10/414/348, filed Apr. 15, 2003, which is also a continuation of U.S. application Ser. No. 09/265/236 filed Mar. 8, 1999 issued as U.S. Pat. No. 6,560,461, which in turn is a continuation-in-part of U.S. application Ser. No. 08/905,674, filed Aug. 4, 1997 issued as U.S. Pat. No. 5,918,159. This application is related to PCT Application US 98/19270. These related applications are incorporated herein by reference.

BACKGROUND OF THE INVENTION

The field of the invention is telecommunication services and systems, specifically such services and systems that have the ability to locate a remote unit using a telecommunication network.

Today, portable mobile telecommunication devices such as cellular telephones, pagers and other handheld information receiving devices are utilized by a greater cross section of the population since they are relatively inexpensive to acquire. Normally information from a communication source is transmitted to a subscriber in possession of a handheld communication information receiving device at a remote global location. The caller or source of information dials a number and a communication channel is set up for communication with a remote receiving unit such as a handheld communication device. Currently there is no infrastructure in place whereby a caller may request the location of the remote receiving unit from the network. The caller or communication source cannot determine where a message is sent.

SUMMARY OF THE INVENTION

The present invention is directed to a communication system using a network of signal transmitting and receiving units and remote receiving units. Information about the location of the remote receiving units is employed by the system.

In a first separate aspect of the present invention, a network of signal transmitting and receiving units and at least one positioning transmitter for transmitting positioning information communicate with a remote receiving unit. The remote receiving unit is capable of selectively providing secured and accessible remote receiving unit position information to the network of signal transmitting and receiving units.

In a second separate aspect of the present invention, the foregoing aspect further includes a terrestrial control station and terrestrial signal transmitting and receiving stations and/or satellite signal transmitting and receiving stations.

In a third separate aspect of the present invention, a network of signal transmitting and receiving units includes means for determining that the location of a remote receiving unit is requested. A means for locating the signal transmitting and receiving unit in the network which is able to communicate with the remote receiving unit is employed with a means for reporting the location of that unit.

In a fourth separate aspect of the present invention, the positioning information of a remote receiving unit is provided to a network of signal transmitting and receiving units with the information selectively secured by the remote receiving unit from inquiry to the network. The remote receiving unit may be capable of communication with at least one positioning transmitter and capable of two way communication with the network of signal transmitting and receiving units to disclose a global location to the network. The network may include satellite units and terrestrial units.

In a fifth separate aspect of the present invention, a method for divulging or blocking the location of a remote receiving unit associated with a network is contemplated. The method includes receiving authorization at the network to block or divulge the location from the remote receiving unit, receiving a request at the network for the location of a remote receiving unit, identifying the source of the request if required, transmitting the request and the identification of the source of the request by the network to the remote receiving unit for authorization and responding to the request according to the authorization. A sensory signal may be transmitted from the remote receiving unit until transmitting the positional information is successfully completed.

In a sixth separate aspect of the present invention, a method for updating a network of signal transmitting and receiving units about the positional information for a remote receiving unit includes providing positional information about the remote receiving unit to the remote receiving unit, comparing the positional information with pre-selected active areas stored in the remote receiving unit and generating a sensory signal at the remote receiving unit if the comparison is negative. The network may be updated with the positional information of the remote receiving unit.

In a seventh separate aspect of the present invention a method for transmitting a message to a remote receiving unit by a network of signal transmitting and receiving units includes configuring the message to include the addresses of at least selected signal transmitting and receiving units of the network and transmitting the message to a series of signal transmitting and receiving units of the network in series. The units with a selected address beams the message to the corresponding coverage areas. The message is then reconfigured to eliminate the address of the receiving signal transmitting and receiving unit before it is re-transmitted to a subsequent signal transmitting and receiving unit.

In an eighth separate aspect of the present invention, any of the foregoing aspects are contemplated to be combined.

Thus, it is an object of the present invention to provide an improved communication network. Other and further objects and advantages will appear hereafter.

DETAILED DESCRIPTION OF THE PREFERRED EMBODIMENT

Figure 1:
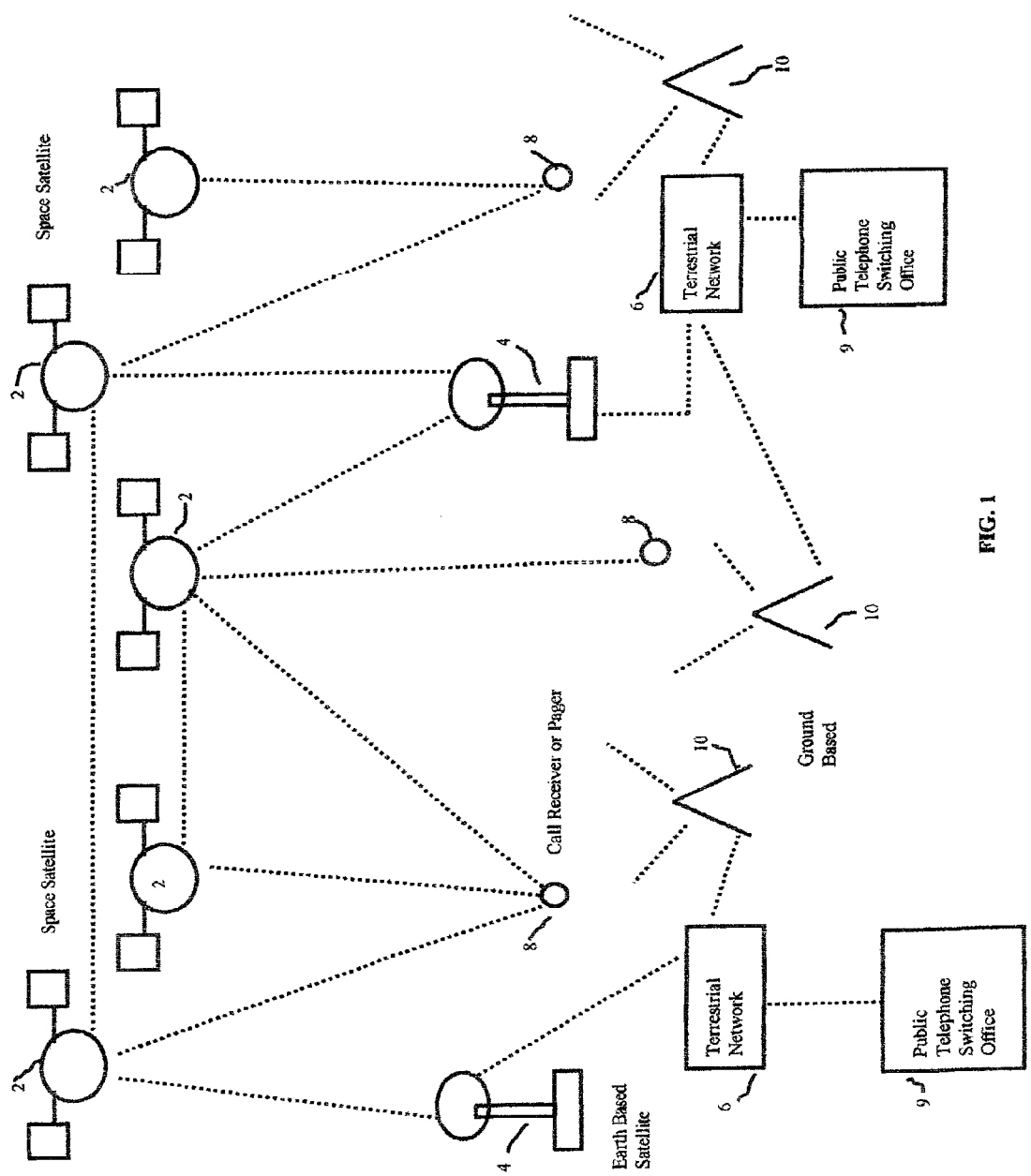
FIG. 1 shows a global satellite paging network.

The present system will consist of satellites [2] in space, communicating with earth based stations [4] and the remote receiving unit [8] which may variously be referred to as a call receiver or pager. Ground based transmitters [10] will be employed to transmit pages to the remote receiving unit [8]. Terrestrial network control stations [6], will be employed to effectively control the activities of the entire global paging network. The system will be developed such that a remote receiving unit operating under an existing paging systems will work. Thus, a network of signal transmitting and receiving unit is developed.

Upon subscribing to a paging network a subscriber selects global areas (pre-selected paging areas) where they wish to receive paging messages. The pre-selected areas, pager ID, paging protocol and other relevant information of the remote receiving unit are stored in the data library of a paging control station[6] for all pagers utilizing the paging network. The remote receiving unit [8], will periodically resolve a global position from signals transmitted from satellites and earth based communication means. The resolved global position will be periodically utilized to update the network each time a user is out of their paging area or each time the paging network requests a remote receiving unit to disclose their global position. This will enable the paging network to know the exact global location of a remote receiving unit whenever the need arises. Messages received for a remote receiving unit are processed by the network and transmitted to the global or active area of the remote receiving unit.

To initiate a page, a caller or communication source may use any regular communication device such as a telephone, personal computer to access the paging network. The caller may add specific codes to a paging message to enable the paging network to disclose the global position of the remote receiving unit after the message is transmitted. The caller's message is firstly processed by the local telephone switching office [9] before transmission to the paging control station[6]. The paging control station [6] will be employed to control all the activities of the network. Upon receiving a paging message, a paging control station decodes the message for relevant information such as pager ID and determines if a caller requires the global position of the pager. Other relevant information such as the paging protocol of the remote receiving unit, pre-selected or preferred worldwide areas to receive pages and the current active area of the remote receiving unit are retrieved from the paging control station's data library. The paging control station [6] validates the current active area of the remote receiving unit with the pre-selected areas to receive pages. If the current active area of the remote receiving unit is valid and within a pre-defined time interval the message is transmitted to the remote receiving unit. If the current active area is invalid (remote receiving unit is out of pre-selected paging area) the message is not transmitted to the remote receiving unit and the caller is notified. In instances where the current active area of the remote receiving unit is valid but the remote receiving unit has not updated the network with its current position over a pre-defined time period, the paging control station will encode the message such that a request will be placed for the remote receiving unit to update its current active global position. As each subscriber of the paging network can only travel a limited distance by air, land or sea within a pre-defined time interval, the paging network, based upon when a remote receiving unit last updated their global location will select appropriate earth based stations and space satellites to transmit the message to the remote receiving unit at specified worldwide locations. The remote receiving unit upon receiving this signal will disclose their global location.

As a user travels from city to city or country to country, the remote receiving unit will periodically resolve a global position from signals transmitted from satellites and earth based communication means. This information will be utilized by the remote receiving unit or user in possession of the remote receiving unit to update the current active area held by the paging network for that remote receiving unit. Also, the remote receiving unit will store this information in its memory such that future resolved global positions could be validated against this information to ensure that the active area currently held and utilized by the paging network to transmit pages to the remote receiving unit is not outdated.

Once a control station determines where a message will be sent, the control station determines the best possible way to transmit the message. With a knowledge of the geographical distribution of all earth based satellite transmitters[4], ground base transmitter stations[10] and space satellites[2], the paging control station[6] will encode a message such that the sequence of transmission of the message will be included. The ID of all the ground stations or space satellites that will be employed in the message transmission chain will be encoded in a chronological order and the message will be routed to the first ground station. This station could be an earth station that transmits directly to satellite[4], or a ground based transmitter [10]. For example, after a paging control station encodes a message and determines which stations (earth or satellite) should transmit the message, the message is routed to the first earth station. The first earth station could either transmit the message directly to satellite or beam the message to their coverage area. Subsequent stations that receive the message decode the message and determine if other stations are required to transmit the message. If other stations are required to transmit the message the current station re-encodes the message so as to eliminate itself from the message transmission chain before retransmitting the message to the next station. By re-encoding the message an earth station or satellite station will prevent subsequent stations involved in the message transmission chain to retransmit the message back to that station. If an earth station or satellite determines it is required to broadcast a message, the message is beamed to the area covered by that station. The transmission chain continues until the last station broadcasts the message and acknowledges with a status signal which is sent back to the paging control station. Upon receiving this signal, the ground control station can alert the caller that the message was successfully sent. Therefore, with a knowledge of the geographical distribution of the paging network's earth and satellite transmitters, and a knowledge of the current active area of a remote receiving unit, a ground control paging station could effectively encode a caller's message to include all satellite and earth based stations that will be employed in the message transmission chain. This will eventually minimize the risk of a satellite or earth based transmitter from being overloaded.

Once a paging control station[6] receives a message from a caller, the control station, determines if the caller requested the global position of the remote receiving unit. The control station then verifies from its data library if the positioning disclosure feature for that remote receiving unit has not been blocked by the subscriber. Each remote receiving unit will have a special code whereby if identified in a caller's paging information, will allow the paging control station to disclose the remote receiving unit global position. If such a code is not detected in a callers message and the caller requested the global location of a remote receiving unit, the caller will be immediately notified that their request was not authorized by the subscriber using the remote receiving unit. A subscriber may change their positioning disclosure code at anytime and reveal such information only to individuals who could acquire information regarding their global whereabouts from the paging network. The paging network will only override the users request and disclose a subscribers global position only in an emergency circumstance. Also the network operation could be such that a network might disclose all locations whenever a call is placed to a subscriber and subscribers may opt not to have their location disclosed.

Figure 3:
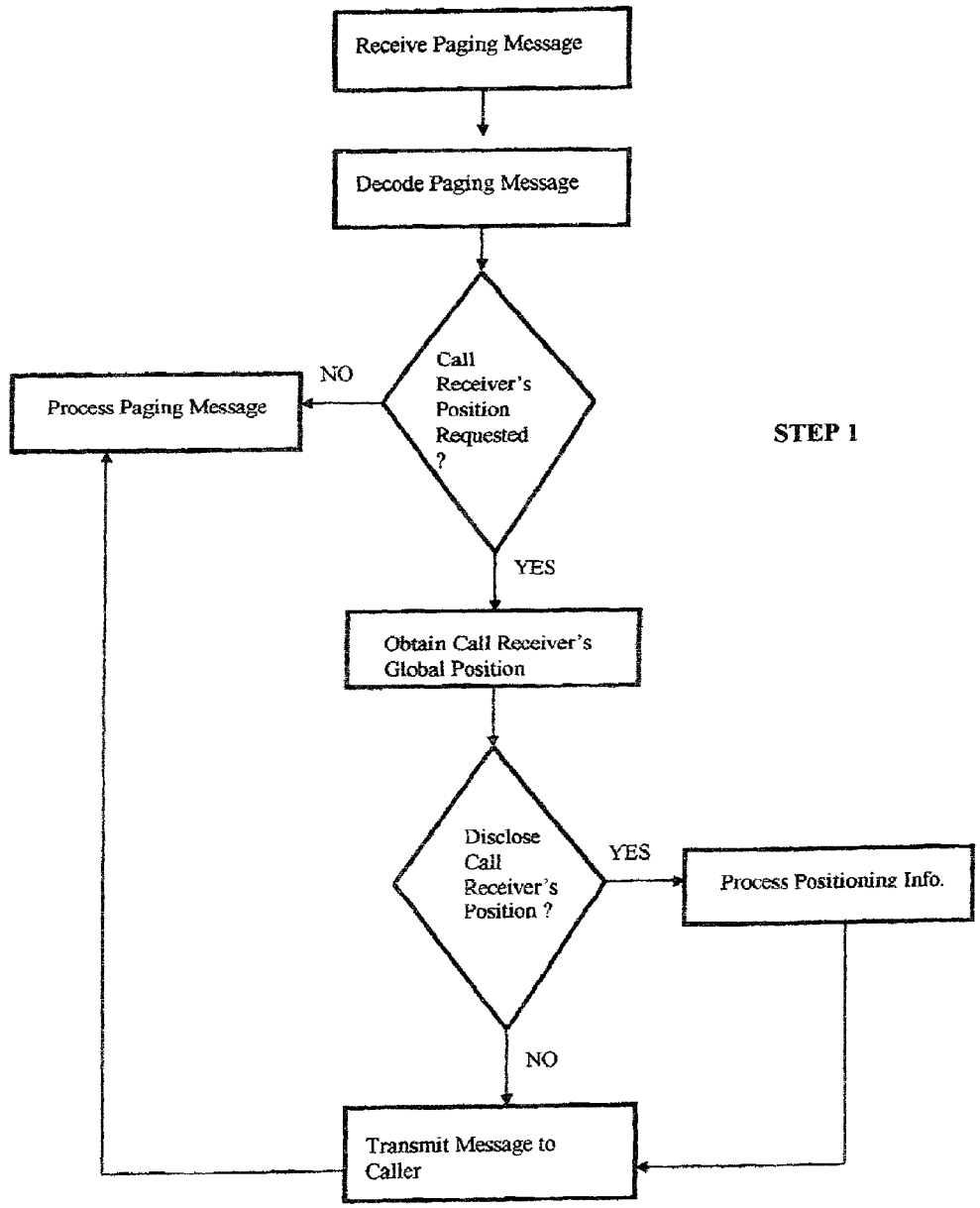
FIG. 3 shows a flow chart illustrating the operation of a paging network control station each time a caller request for the global position of a remote receiving unit.

If the positioning disclosure feature is blocked for any call, a message is sent to the caller indicating that the subscriber does not wish their current global position disclosed. If the positioning disclosure feature is active, the control station retrieves the coordinates of the remote receiving unit global position and encodes that information before transmission to the caller. Such information may describe the latitude and longitude of the subscriber including a more simplified information such as the country, city or town were the message was sent. The steps carried out by the control station during this process are best illustrated in step 1, FIG. 3. In this illustration, the paging control station upon receiving a paging message decodes the message and checks if the message includes a request for the remote receiving unit global position. If such information is not required the message is processed normally. If the remote receiving unit global position is required and the positioning disclosure code is detected, the remote receiving unit positioning information is retrieved from the data bank of the paging control station. If the information retrieved from the paging control station's databank is unavailable or out of date, a request could be made that the remote receiving unit disclose its current position. If the control station establishes that the positioning disclosure feature is blocked for that message, the caller is immediately notified with the appropriate message. If the remote receiving unit positioning disclosure feature for the message in process is active, the positioning information of the remote receiving unit is processed and transmitted to the caller and the caller's message is processed for dispatch to the remote receiving unit as previously disclosed.

A communication source may request the unit to disclose its position to one or more communication targets. Upon receiving this signal the caller may be alerted and location information of the unit may be selectively or fully relayed to the respective communication targets. In instances where a communication source does not have direct access to obtain a subscriber's location from the communication network, the source may poll for the location of a remote unit by including specific information which when received by the remote receiving unit will reveal the identity of the source and a request for the location of the remote unit. The remote unit may either accept or decline to this request by transmitting specific information back to the paging network which will reveal or block the location to the caller.

In another scenario a remote unit may disclose location information to a communication target such as a remote computer or terminal via the network. In this situation a user selects or specifies the destination ID of the communication target, which may be a computer or terminal address. The location of the remote unit is resolved and transmitted to the communication target via the network with the appropriate information if available. In a distress situation a subscriber may use this feature to alert the network with location and relevant distress information which when received by the network could enable the dispatch of an emergency team to that location. Other service industries may utilize the network to allow for certain types of information that are location dependent disclosed to their site. For instance a caller driving on a highway and in full view of an accident may simply disclose that information through the input panel and the appropriate authority could be notified of such an event happening at that location. In a rainy, foggy or highly congested traffic area a subscriber in possession of this unit may relay such an event to the appropriate authority. Furthermore, subscribers may use this feature at any time to log their locations at their home computer or any relevant Internet site by selecting or specifying the appropriate ID or address for location information dispatch.

For positioning, the remote receiving unit will be preprogrammed to periodically resolve a position from signals transmitted from satellites and earth based communication means. At least the remote receiving unit should have the means to provide the paging network with positioning information. Some of the satellites and earth based transmitters used to transmit paging information could be employed to transmit referenced positioning signals to the remote receiving unit. Alternatively the Global Positioning System well known in the art as GPS could also be utilized by the remote receiving unit to resolve a global position. However the remote receiving unit should have a means to resolve a global position from L-band signals transmitted from at least one satellite, depending on the resolving technique employed. GPS is currently being used to provide worldwide positioning information to mobile users around the globe. Such positioning information has an accuracy of about one hundred meters and could further be improved to an accuracy of five meters if referenced signals from ground based transmitters are utilized in the resolving process. A fully operational Global Positioning System includes up to 24 satellites dispersed around six circular orbits. The dispersion and inclination of the satellites is such that at least three or more satellites are readily visible from most parts on the earth surface. In a typical example, for a remote receiving unit to resolve a global position, the remote receiving unit need to solve for two variables of position, latitude and longitude. The satellites, equipped with atomic clocks act as a beacon and transmit signals that tell the remote receiving unit where it is and what time the signal was sent. From this information, a remote receiving unit can determine how far it is from the satellite by comparing the time sent with the time received and multiplying by the speed of light (distance=velocity * time). Since there is a bias between the GPS time and the user's time, a third variable time will be required. Having three satellites in view at any point in time, a remote receiving unit will be able to solve for latitude, longitude and time. For three dimensional positioning a fourth variable and satellite will be required. Upon resolving a global position the remote receiving unit could update the network with its present global location or the remote receiving unit could alert a user when they are out of their active or preselected global areas to receive pages.

Figure 2:
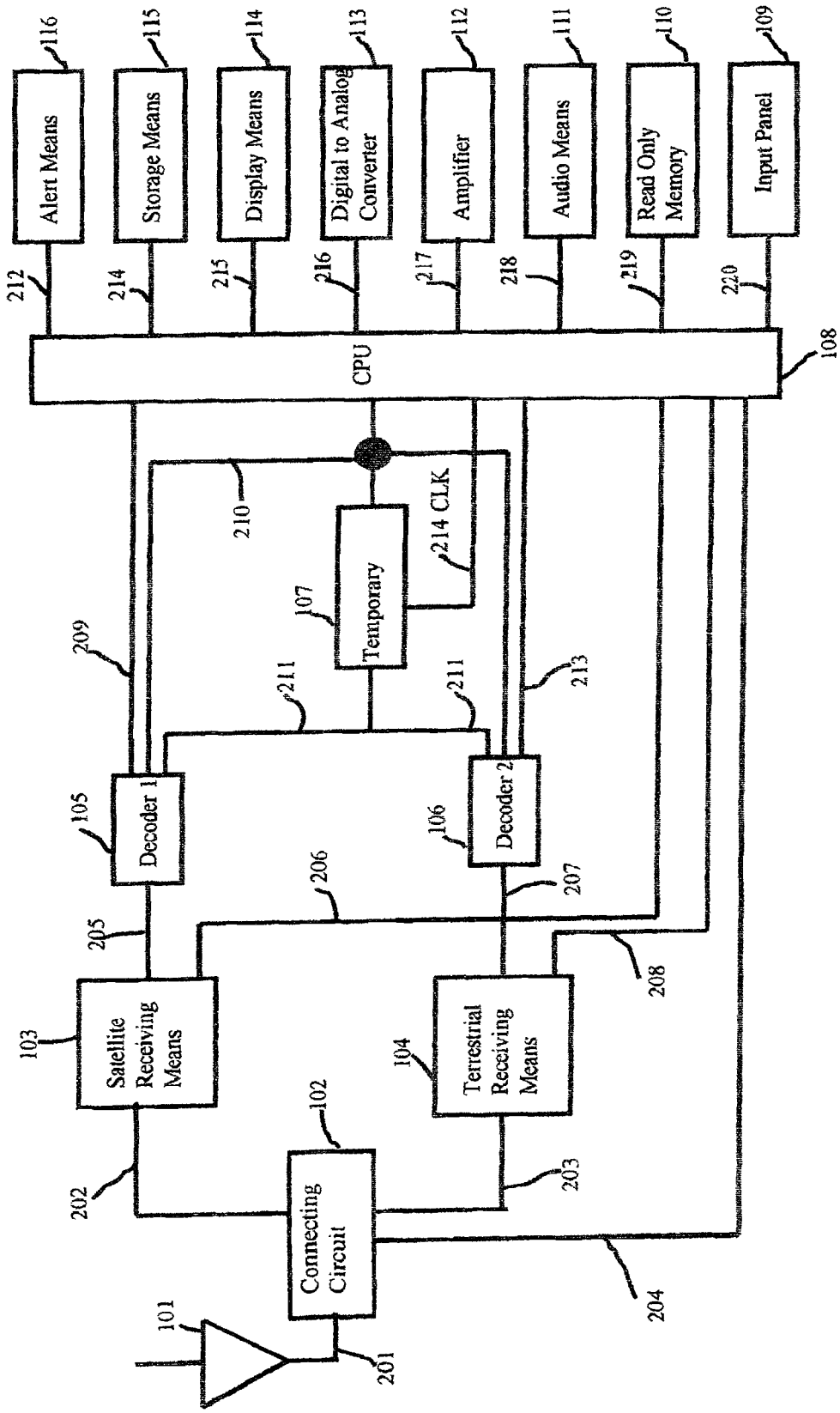
FIG. 2 shows a block diagram of the remote receiving unit, or pager.

The remote receiving unit (FIG. 2) will receive messages transmitted from satellites and terrestrial based transmitters through the transceiver [101]. The connecting circuitry [102] of the remote receiving unit, controlled by the CPU [108], will route satellite based signals via 202 to the satellite receiving means[103] and terrestrial based signals via 203 to the terrestrial receiving means[104]. The connecting circuitry may include a filter arrangement and a switch that will allow L-band or satellite frequencies to pass via 202 and terrestrial or Ultra High Frequencies to pass via 203. This signals could either be paging message signals or global positioning signals. Therefore depending on the pre-loaded protocols and initialization data, the CPU will drive the connecting circuitry [102], satellite receiving means [103], terrestrial receiving means [104] to scan and process specific frequencies.

Satellite signals are processed by the satellite receiving means [103]. This unit will process global positioning satellite signals and satellite message signals. The satellite receiving unit will include satellite signal amplifiers, mixers and filters that will convert the L band global positioning and message signals received from the connecting circuit to an appropriate level for efficient processing by the decoding circuit [105]. The satellite receiving means circuitry is well known by any one well skilled in the art. The operation of this unit is controlled by the microprocessor or CPU [108] via 206.

The CPU determines the appropriate intermediate frequencies and output signals that will be generated by the satellite receiving unit [103]. This is based on the initialization parameters pre-loaded in the ROM [110] of the remote receiving unit. The CPU controls the satellite receiving unit via 206, and the output signals produced by the satellite receiving unit [103] are routed via 205 to the decoder[105] for intelligence extraction and error correction. Decoder [105] is controlled by the CPU [108] via 209. Transmission of data directly by Decoder [105] or Decoder [106] to the CPU input port via 210 is determined by the CPU. If the CPU determines satellite messages are of high priority Decoder [105] is signaled via 209 to transmit data directly to the CPU via 210 and Decoder [106] is signaled via 213 to temporary hold its data. Decoder [106] will store its data in the Temporary Store [107] via 211 for later retrieval by the CPU. If terrestrial based signals are of a higher priority Decoder [105] is signaled to temporary hold its data. Again each decoder could be equipped with a store eliminating the use of the Temporary Store[107]. If a decoder is not equipped with storage means, the decoder could download its data via 211 to the temporary data storage while the other decoder will transmit directly to the CPU via 210. If multiple decoders are required to decode multiple satellite and earth based signals (message and positioning signals), the CPU could again determine when each decoder should transmit it's data to the CPU's input port, with each decoder equipped with the appropriate storage means to temporarily hold it's data until such transmit instruction is received from the CPU.

Terrestrial based signals will be processed by the terrestrial receiving means [104]. This UHF or VHF signals will be routed by the connecting circuitry[102] via 203 to the terrestrial receiver[104]. Again, the terrestrial receiving unit will include Ultra High Frequency (UHF) or Very High Frequency (VHF) amplifiers, filters and down converting circuitry to process the signal from 203 to an appropriate level for efficient processing by decoder[106]. Direct transmission of data from decoder 2 [106] to the CPU via 210 will be controlled by the CPU. The operation of this part of the receiver will be similar to the satellite receiving end. Therefore, the CPU[108] will control the operation of the connecting circuitry, the satellite and terrestrial receiving means. The CPU[108] will have the ability to determine exactly when a satellite or terrestrial message or positioning signal is received and processed.

Once the CPU completes processing data from a decoder [106,107], the CPU retrieves data from the temporary data storage[107] for processing. As previously stated multiple decoders could be employed. In this situation each decoder will have the ability to store or hold its data temporarily or use the temporary storage [107] until signaled by the CPU to transmit data directly via 210. Relevant communication links will be added to interface the newly added decoders to the CPU[108], satellite receiving unit [103], and the terrestrial receiving unit[104]. With this technique all message and positioning signals transmitted from either satellite or earth based communication means will be eventually decoded and processed by the CPU, with rarely any message being lost or corrupted in this process.

To conserve receiver power, the CPU could be preprogrammed so as to control the connecting circuitry [102], the satellite receiving module [103], and the terrestrial receiving module[104], to process positioning signals periodically in this situation only paging messages (voice and alphanumeric) will be allowed to pass, while positioning information signals will be periodically blocked. If a paging message received requires the remote receiving unit to disclose its current global location, the CPU[108] upon detecting this request will allow the remote receiving unit to resolve a global position from satellite and earth based referenced signals before resuming operation normally.

If a decoded message received by the CPU via 210 is voice or alphanumeric, the CPU alerts the user either through the display[114], alert means [116] or audio means [111] as to the presence of a new message. Alphanumeric messages are displayed through the display while voice messages are routed to the digital to analog (D/A) converter[113], so that they are converted to their analog format by the D/A converter. The analog signal is amplified by the amplifier [112], and the amplified signal is used to drive the audio means [111] (speaker or earphone). The memory means [115] is used to store messages for future replay by the user. These messages are first compressed by the CPU before storage in memory. Prior to replay or redisplay the messages are decompressed.

Once a user subscribes to the global paging network, the remote receiving unit is initialized. Relevant data such as the paging protocols, frequencies, preferred paging locations and other relevant data are down loaded into the ROM[110] of the remote receiving unit. As the user travels from one global location to another, this information will be used by the CPU to control the actions of all modules of the remote receiving unit.

Figure 4:
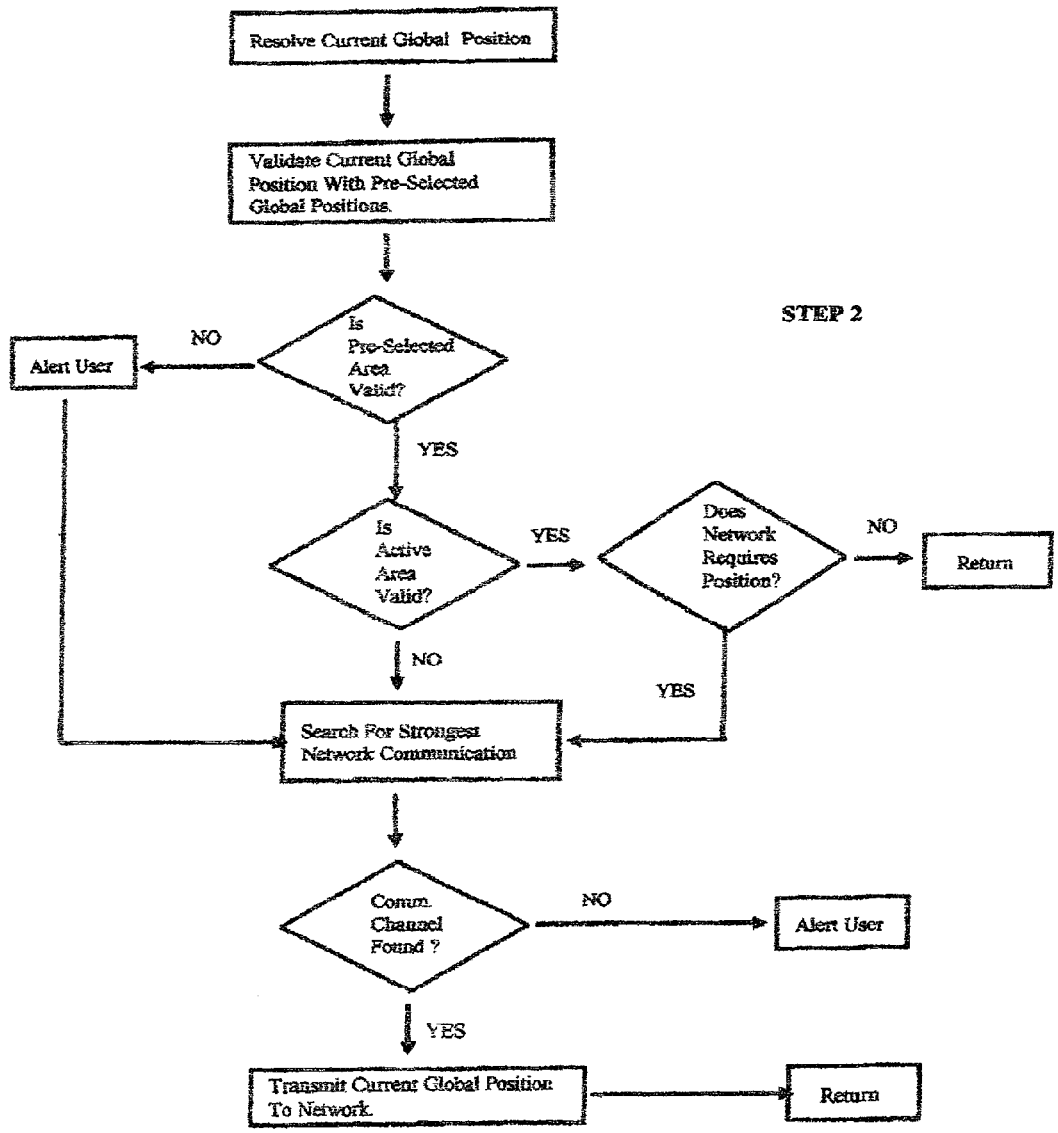
FIG. 4 is a flow chart illustrating the operation of a remote receiving unit when a global position is resolved in an attempt to determine if the remote receiving unit is out of their paging area.

A remote receiving unit will have the ability to resolve a global position from signals transmitted from satellites and earth based communication means. Periodically, the remote receiving unit will resolve a global position from these signals and compare it to reference encoded global position coordinates pre-loaded in its ROM [110]. If the CPU [108] establishes that the current global position of the remote receiving unit is not within the user's preferred location to receive pages, the user is immediately alerted that they are out of their paging area and no paging messages will be received. If the remote receiving unit current active area to receive pages is not within the previously stored active areas, the user is alerted to update the paging network with their current active area. The network may also request the remote receiving unit for its current global position. If such a message is received the subscriber in possession of the remote receiving unit is notified that an update of the network is required. The remote receiving unit will scan for the strongest network communicating channel via transceiver[101]. If such a link is established, the remote receiving unit will automatically update the network with its current global positioning coordinates. In circumstances where the remote receiving unit does not find a suitable network channel for direct communication, the remote receiving unit will alert the user that no RF communicating channel was found for automatic update of its current global position. In this situation a user could update the network by calling in and disclosing their current global coordinates resolved by the remote receiving unit. If the user is required to update the network, the remote receiving unit will periodically alert the user to update the network until an input is received from the user through input panel[109] via 220 indicating that the action has taken place. The CPU[108] will store in its memory the current resolved global position of the remote receiving unit as the current active area of the remote receiving unit held by the paging network. This will enable the CPU to determine when an active area update of the paging network is required without waiting for the network to request for such information. The actions undertaken by the remote receiving unit during this processes are best illustrated in Step 2, FIG. 4. In this illustration, the remote receiving unit first resolves a global position. Such a request might have been initiated from the user through input panel [109], the paging network or from within the remote receiving unit CPU. Upon resolving a global position, the remote receiving unit validates this position with the pre-selected areas to receive pages usually stored in the ROM. If the pre-selected areas are valid, the remote receiving unit further checks if its current active area to receive pages is valid. If the remote receiving unit current active area to receive pages is valid, the CPU checks if the paging network requires the current global coordinates of the pager. If the network does not require the remote receiving unit to update its position, the remote receiving unit resumes operation normally. If the current active area of the remote receiving unit is invalid or the pre-selected area to receive pages is invalid or the network had requested for the remote receiving unit global location, the remote receiving unit searches for the strongest network communication channel to transmit its current global position. If such a channel is found the network is automatically updated. If no such channel is found the user is alerted to update the network with the current global coordinates resolved by the remote receiving unit.

At any point in time a subscriber could use the remote receiving unit or any relevant terrestrial communication device to activate or deactivate their positioning disclosure feature from the network. In the deactivated mode the network will not disclose a subscriber's global location to a caller requesting that information. A user may override the periodic global positioning resolving feature of the remote receiving unit to obtain a current global position through the input panel [109] at any time. Once the CPU[108] resolves and makes this information available to the user, the terrestrial receiving means [104], satellite receiving means [103] and the connecting circuit[102] will be signaled to resume operation normally. With the aid of the input panel [109] and the display [114] relevant information such as current active paging area, pre-selected areas, and the remote receiving unit current global position will always be made available to a user such that an update of the paging network could be done by a user in possession of the remote receiving unit at any point in time and at any global location without a request from the network.

What is claimed is:

1. A communication system comprising:
    (a) one or more mobile remote units that are able to communicate with a transmitter to establish their location information within the system;
    (b) a plurality of communication resources that are authorized in advance to access the location information of the one or more mobile remote units from the system;
    (c) one or more privacy components for selectively granting or denying access to the location information of the one or more mobile remote units to one or more communication resources among the plurality of communication resources when the location information of the one or more mobile remote units has been established within the system, wherein the one or more privacy components are able to communicate with, or receive information from, one or more memory components to determine whether to grant or deny said access.

2. The system of claim 1 wherein the privacy component is operable from the one or more mobile remote units.

3. The system of claim 1, wherein the mobile remote unit is able to receive and display messages from the communication resources and is further able to resolve its location information using global positioning satellite information.

4. The system of claim 1, wherein the memory component is able to store information (i) identifying one or more resources among the plurality of communication resources and/or (ii) indicating whether access to the location information of one or more mobile remote units should be granted or denied to the one or more resources.

5. The system of claim 1, wherein the system includes one or more components for receiving requests for location information from the communication resources and verifying that the resources are authorized to access location information from the system.

6. A communication system comprising:
    (a) one or more mobile remote units that are able to communicate with a transmitter to establish their location information within the system;
    (b) a plurality of communication resources authorized to request the location information of the one or more mobile remote units from the system, wherein the plurality of communication resources have been authorized in advance of their submission of a request for location information (preauthorized);
    (c) one or more controllers for receiving requests for the location information of the one or more mobile remote units and determining whether the location request is submitted by the plurality of preauthorized communication resources;
    (d) one or more privacy components for communicating with, or receiving information from, one or more memory components to determine whether to divulge the location information of the one or more mobile remote units to one or more pre-authorized communication resources among the plurality of preauthorized communication resources, wherein the determination is based on location privacy data of the one or more mobile remote units; and
    wherein the communication system is able to both (i) allow access to the location information of the one or more mobile remote units to the one or more preauthorized communication resources requesting the location information and (ii) deny access to other preauthorized communication resources requesting the location information.

7. The system of claim 6, wherein the mobile remote unit is able to establish its location information within the system when access to its location information is being denied to one or more preauthorized communication resources.

8. The system of claim 6, wherein the location privacy data is not accessible to one or more preauthorized communication resources.

9. The system of claim 6, wherein the preauthorized communication resources include one or more applications relating to location services and the mobile remote unit is able to process voice and alphanumeric messages.

10. A method for providing or denying access to a location of a mobile handset to a communication resource comprising:
    (a) receiving a communication from one or more mobile handsets, satellites and/or earth stations that establishes a location of the one or more mobile handsets within a communications network;
    (b)(1) receiving a request for the location of the one or more mobile handsets from one or more of a plurality of communication resources;

(b)(2) authenticating that the one or more of the plurality of the communication resources submitting the request has been authorized in advance (preauthorized) to submit the request to the network;

(c) receiving from a memory component, privacy information relating to the one or more mobile handsets indicating whether the location of the one or more mobile handsets may be disclosed to the one or more of the plurality of preauthorized communication resources;

(d) using the privacy information to determine whether to provide or deny access to the location of the one or more mobile handsets to the one or more the plurality of preauthorized communication resources submitting the request in step (b)(1), wherein the location of the one or more mobile handsets is only provided to (i) the one or more pre-authorized communication resources among the plurality of pre-authorized communication resources that are (ii) permitted to access the location according to the privacy information.

11. The method of claim 10, wherein the preauthorized communication resources include one or more applications relating to location information services.

12. The method of claim 10, wherein the authentication includes determining whether the request includes or is accompanied by one or more codes or passwords provided to the communication resource in advance of the request.

13. A mobile handset associated with a communication system comprising:

(a) a positioning component that can communicate with a wireless network to establish location information of the mobile handset;

(b) a controller that can provide the location information of the mobile handset to a plurality of communication resources authorized in advance (preauthorized) to request access to the location information of the mobile handset;

(c) a location privacy feature for selectively allowing or denying access to the location information of the mobile handset to one or more of the pre-authorized communication resources among the plurality of preauthorized communication resources, wherein said location privacy feature includes a privacy component that receives information from one or more memory components to determine whether to allow or deny said access.

14. The system of claim 13, wherein the privacy feature can be used to allow or deny access to the location information independent of whether the positioning component is able establish the location information.

15. The system of claim 13, wherein the mobile handset is able to receive and process voice and alphanumeric messages.

16. A communication system comprising:

(a) one or more mobile communication units;

(b) a network for providing location information of the one or more mobile communication units to the system;

(c) a plurality of communication resources that are preauthorized to access the location information of the one or more mobile communication units from the system;

(d) a controller for determining whether a communication resource of the plurality of communication resources submitting a request for the location information of the one or more mobile communication units is among the plurality of preauthorized communication resources; and (e) one or more positioning disclosure features for selectively allowing or denying access to the location information of the one or more mobile communication units to one or more of the pre-authorized communication resources among the plurality of preauthorized communication resources, wherein said one or more positioning disclosure features includes a privacy component that receives information from one or more memory components to determine whether to allow or deny said access.

* * * * *